United States Patent
Hwang et al.

(10) Patent No.: US 10,285,191 B2
(45) Date of Patent: May 7, 2019

(54) METHOD FOR TRANSMITTING UPLINK CHANNEL AND WIRELESS DEVICE REQUIRING COVERAGE ENHANCEMENT

(71) Applicant: LG Electronics Inc., Seoul (KR)

(72) Inventors: Daesung Hwang, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/536,788

(22) PCT Filed: Dec. 15, 2015

(86) PCT No.: PCT/KR2015/013763
§ 371 (c)(1),
(2) Date: Jun. 16, 2017

(87) PCT Pub. No.: WO2016/099135
PCT Pub. Date: Jun. 23, 2016

(65) Prior Publication Data
US 2017/0374675 A1    Dec. 28, 2017

Related U.S. Application Data

(60) Provisional application No. 62/245,297, filed on Oct. 23, 2015, provisional application No. 62/204,965, (Continued)

(51) Int. Cl.
*H04L 5/00* (2006.01)
*H04W 72/04* (2009.01)
*H04W 72/12* (2009.01)

(52) U.S. Cl.
CPC ....... *H04W 72/1268* (2013.01); *H04L 5/0051* (2013.01); *H04L 5/0055* (2013.01);
(Continued)

(58) Field of Classification Search
CPC ........... H04W 52/146; H04W 72/0413; H04W 52/367; H04W 74/0833; H04W 52/281; H04W 52/32; H04L 5/0037; H04L 1/001
See application file for complete search history.

(56) References Cited

U.S. PATENT DOCUMENTS

2009/0279459 A1   11/2009   Muharemovic et al.
2010/0074205 A1*  3/2010   Papasakellariou .... H04L 5/0007
                                                   370/329
(Continued)

FOREIGN PATENT DOCUMENTS

| EP | 2806581 A1 | 11/2014 |
|----|------------|---------|
| EP | 2999140 A1 | 3/2016 |
| WO | 2014185749 A1 | 11/2014 |

OTHER PUBLICATIONS

LG Electronics Inc., "Summary of Offline Discussion on Clarification of PUSCH Rate Matching with SRS," R1-144485, 3GPP TSG RAN WG1 Meeting #78bis, Oct. 14, 2014.
(Continued)

*Primary Examiner* — Diane D Mizrahi
(74) *Attorney, Agent, or Firm* — Dentons US LLP

(57) ABSTRACT

One embodiment of the present specification provides a method by which a wireless device, to which coverage enhancement (CE) is applied, transmits an uplink channel. The method can comprise a step for receiving, by the wireless device, sounding reference signal (SRS) configuration information for other wireless devices within a cell. The SRS configuration information can comprise information on SRS transmittable subframes. The method can comprise a step for transmitting, by the wireless device, the uplink channel on symbols except for a final symbol on subframes according to a reduced format, when the wireless device transmits the uplink channel on the subframes
(Continued)

directed by the subframe information within the SRS configuration information for other wireless devices.

8 Claims, 18 Drawing Sheets

Related U.S. Application Data filed on Aug. 13, 2015, provisional application No. 62/202,144, filed on Aug. 6, 2015, provisional application No. 62/109,076, filed on Jan. 29, 2015, provisional application No. 62/093,399, filed on Dec. 17, 2014.

(52) U.S. Cl.
CPC .......... *H04L 5/0094* (2013.01); *H04W 72/04* (2013.01); *H04W 72/0413* (2013.01); *H04L 5/0007* (2013.01); *H04L 5/0012* (2013.01); *H04W 72/0446* (2013.01)

(56) References Cited

U.S. PATENT DOCUMENTS

| | | | |
|---|---|---|---|
| 2016/0082911 A1* | 3/2016 | Kaneko | B60R 19/24 |
| | | | 293/133 |
| 2017/0257197 A1* | 9/2017 | Noh | H04L 5/0007 |

OTHER PUBLICATIONS

Media Tek Inc., "Discussion on PUCCH for Rel-13 MTC UE," R1-144853, 3GPP TSG RAN WG1 Meeting #79, Nov. 8, 2014.
LG Electronics, "Considerations on PUCCH and PUSCH Design for MTC," R1-144894, 3GPP TSG RAN WG1 Meeting #79, Nov. 8, 2014.
NEC, "Coverage Enhancement for PUSCH," R1-144861, 3GPP TSG RAN WG1 Meeting #79, Nov. 8, 2014.
3GPP TS 36.211 V10.4.0, Release 10, Dec. 2011.
Zte, "Bandwidth reduction for low complexity UEs," 3GPP TSG RAN WG1 Meeting #79, Nov. 17-21, 2014, R1-144815.

* cited by examiner

DM-RS

DM-RS

METHOD FOR TRANSMITTING UPLINK CHANNEL AND WIRELESS DEVICE REQUIRING COVERAGE ENHANCEMENT

CROSS-REFERENCE TO RELATED APPLICATIONS

This application is the National Stage filing under 35 U.S.C. 371 of International Application No. PCT/KR2015/013763, filed on Dec. 15, 2015, which claims the benefit of U.S. Provisional application Ser. No. 62/093,399 filed on Dec. 17, 2014, Ser. No. 62/109,076 filed on Jan. 29, 2015, Ser. No. 62/202,144 filed on Aug. 6, 2015, Ser. No. 62/204,965 filed on Aug. 13, 2015, and Ser. No. 62/245,297 filed on Oct. 23, 2015, the contents of which are all hereby incorporated by reference herein in their entirety.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in recent years, communication, i.e., machine type communication (MTC), occurring between devices or between a device and a server without a human interaction, i.e., a human intervention, is actively under research. The MTC refers to the concept of communication based on an existing wireless communication network used by a machine device instead of a user equipment (UE) used by a user.

Since the MTC has a feature different from that of a normal UE, a service optimized to the MTC may differ from a service optimized to human-to-human communication. In comparison with a current mobile network communication service, the MTC can be characterized as a different market scenario, data communication, less costs and efforts, a potentially great number of MTC apparatuses, wide service areas, low traffic for each MTC apparatus, etc.

Since the MTC device may exist at a location where the signal is weak, performance may deteriorate when the base station estimates the channel by using a reference signal transmitted by the MTC device, for example, a demodulation reference signal (DMRS).

Meanwhile, a sounding reference signal (SRS) transmitted by the MTC device may collide with the SRS transmitted by the existing general UE.

SUMMARY OF THE INVENTION

Accordingly, the disclosure of the specification has been made in an effort to solve the problem.

To achieve the foregoing purposes, the disclosure of the present invention proposes a method for transmitting an uplink channel. The method may be performed by a wireless device to which coverage enhancement (CE) is applied. The method may comprise: receiving, by the wireless device, sounding reference signal (SRS) configuration information for other wireless devices in a cell, the SRS configuration information including information on a subframe in which an SRS is transmittable; and when the wireless device is to transmit the uplink channel on a subframe indicated by the subframe information in the SRS configuration information for the other wireless devices, transmitting, by the wireless device, the uplink channel on symbols other than a last symbol on the subframe according to a reduced format.

Even though the wireless device does not transmit the SRS on the last symbol in the subframe indicated by the subframe information, the uplink channel may be transmitted only on the symbols other than the last symbol on the subframe according to the reduced format.

The uplink channel may be a physical uplink control channel (PUCCH) or a physical uplink shared channel (PUSCH).

When the uplink channel is the PUCCH, whether the reduced format is used may be determined according to a higher layer signal.

The SRS configuration information for the other wireless devices may further include configuration information for simultaneous transmission of the SRS and hybrid automatic repeat request (HARQ)-acknowledgement (ACK)/non-acknowledgement (NACK). When the simultaneous transmission of the SRS and the HARQ-ACK/NACK is configured on the subframe indicated by the subframe information in the SRS configuration information for the other wireless devices, the reduced format may be used.

The uplink channel may be repeatedly transmitted on multiple subframes according to the coverage enhancement (CE).

The SRS configuration information for other wireless devices in the cell may be received through the higher layer signal.

When a frequency band in which the wireless device is to transmit the uplink channel and the frequency band in which the wireless device is to transmit the SRS are different from each other, the wireless device may not transmit the SRS on the subframe.

When the frequency band in which the wireless device is to transmit the uplink channel and the frequency band in which the wireless device is to transmit the SRS are different from each other, the transmission of the uplink channel may stop during a time gap required for changing the frequency band for the SRS transmission.

In another aspect, to achieve the foregoing purposes, the disclosure of the present invention proposes a wireless device for transmitting an uplink channel. The wireless device may be configured with a coverage enhancement (CE) and comprise: a transceiver; and a processor controlling the transceiver in connection with the transceiver. The processor may be configured to perform: receiving sounding reference signal (SRS) configuration information for other wireless devices in a cell, the SRS configuration information including information on a subframe in which an SRS is transmittable, and when the wireless device is to transmit the uplink channel on a subframe indicated by the subframe information in the SRS configuration information for the other wireless devices, transmitting, by the wireless device, the uplink channel on symbols other than a last symbol on the subframe according to a reduced format.

According to the disclosure of the present specification, the problems of the above-described prior art are solved.

DESCRIPTION OF EXEMPLARY EMBODIMENTS

Figure 1:
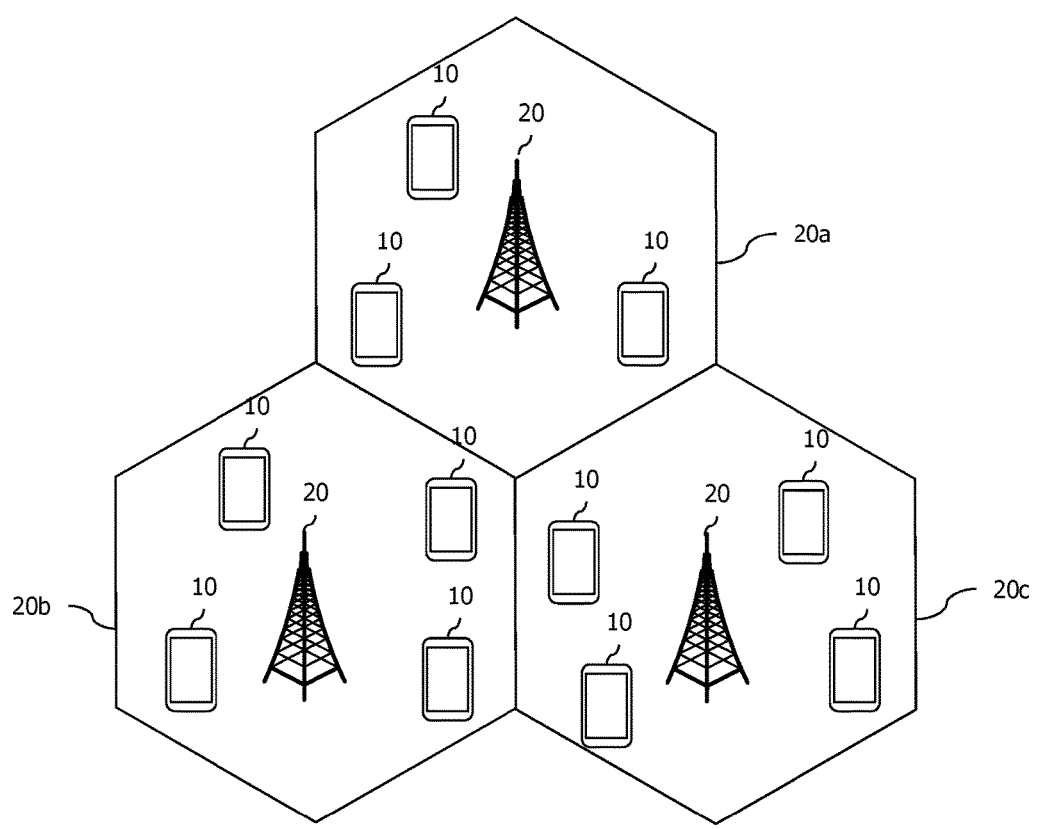
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency region. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a sub-frame, the uplink transmission and the downlink transmission are performed in different sub-frames.

Hereinafter, the LTE system will be described in detail.

Figure 2:
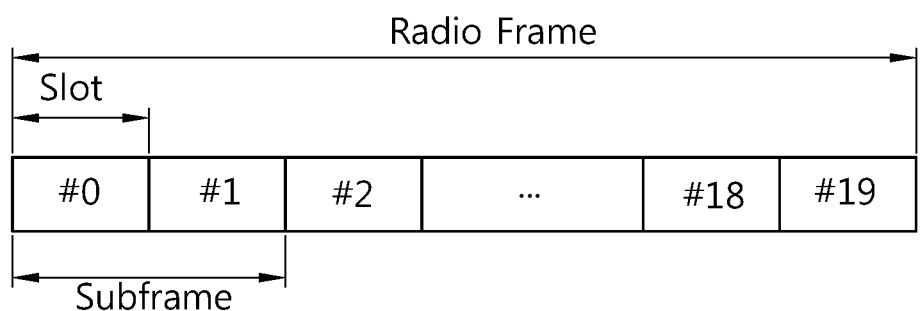
FIG. 2 illustrates the architecture of a radio frame according to frequency division duplex (FDD) of 3rd generation partnership project (3GPP) long term evolution (LTE).

FIG. 2 Shows a Downlink Radio Frame Structure According to FDD of 3rd Generation Partnership Project (3GPP) Long Term Evolution (LTE).

The radio frame of FIG. 2 may be found in the section 5 of 3GPP TS 36.211 V10.4.0 (2011 December) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of orthogonal frequency division multiplexing (OFDM) symbols. The number of OFDM symbols included in one slot may vary depending on a cyclic prefix (CP). One slot includes 7 OFDM symbols in case of a normal CP, and one slot includes 6 OFDM symbols in case of an extended CP. Herein, since the 3GPP LTE uses orthogonal frequency division multiple access (OFDMA) in a downlink (DL), the OFDM symbol is only for expressing one symbol period in a time domain, and there is no limitation in a multiple access scheme or terminologies. For example, the OFDM symbol may also be referred to as another terminology such as a single carrier frequency division multiple access (SC-FDMA) symbol, a symbol period, etc.

Figure 3:
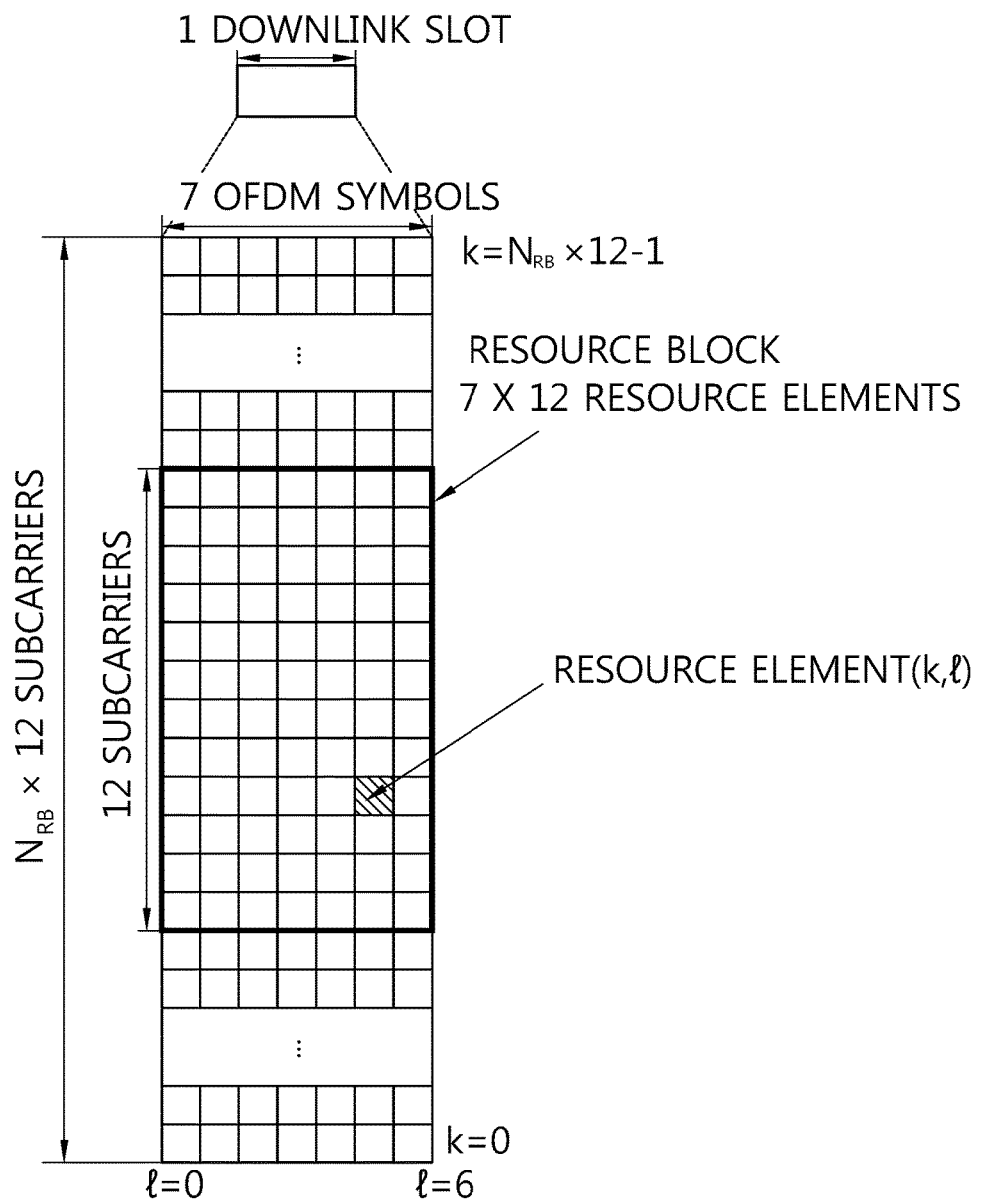
FIG. 3 illustrates the architecture of a downlink radio frame according to time division duplex (TDD) in 3GPP LTE.

FIG. 3 Illustrates an Example Resource Grid for One Uplink or Downlink Slot in 3GPP LTE.

Referring to FIG. 3, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., $N_{RB}$, may be one from 6 to 110.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 3 may also apply to the resource grid for the downlink slot.

Figure 4:
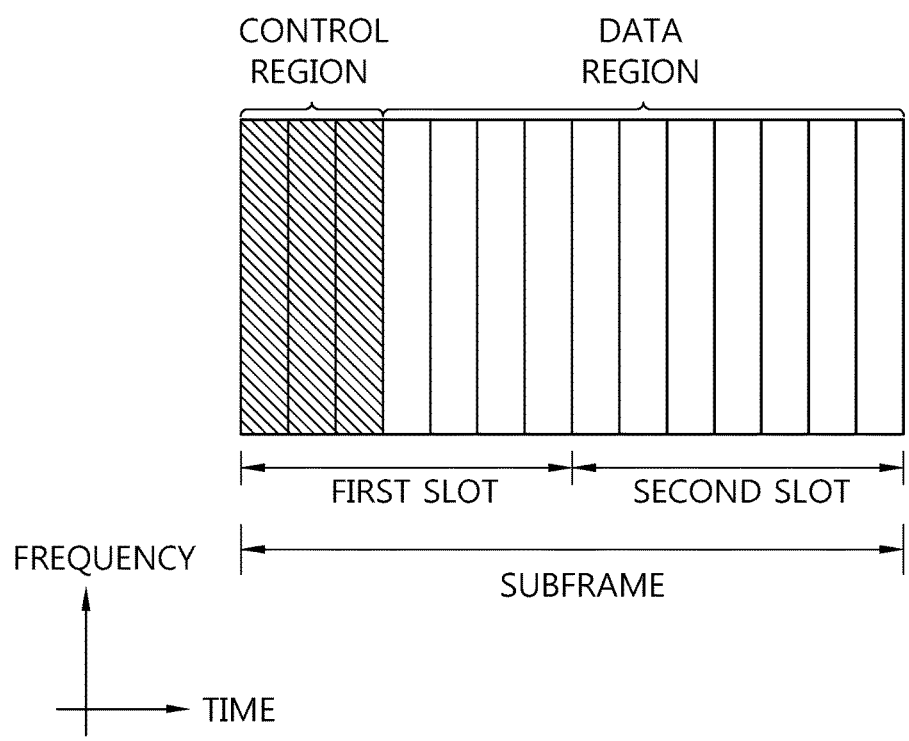
FIG. 4 illustrates an example resource grid for one uplink or downlink slot in 3GPP LTE.

FIG. 4 Illustrates the Architecture of a Downlink Sub-Frame.

In FIG. 4, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are allocated to the control region, and a PDSCH is allocated to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Figure 5:
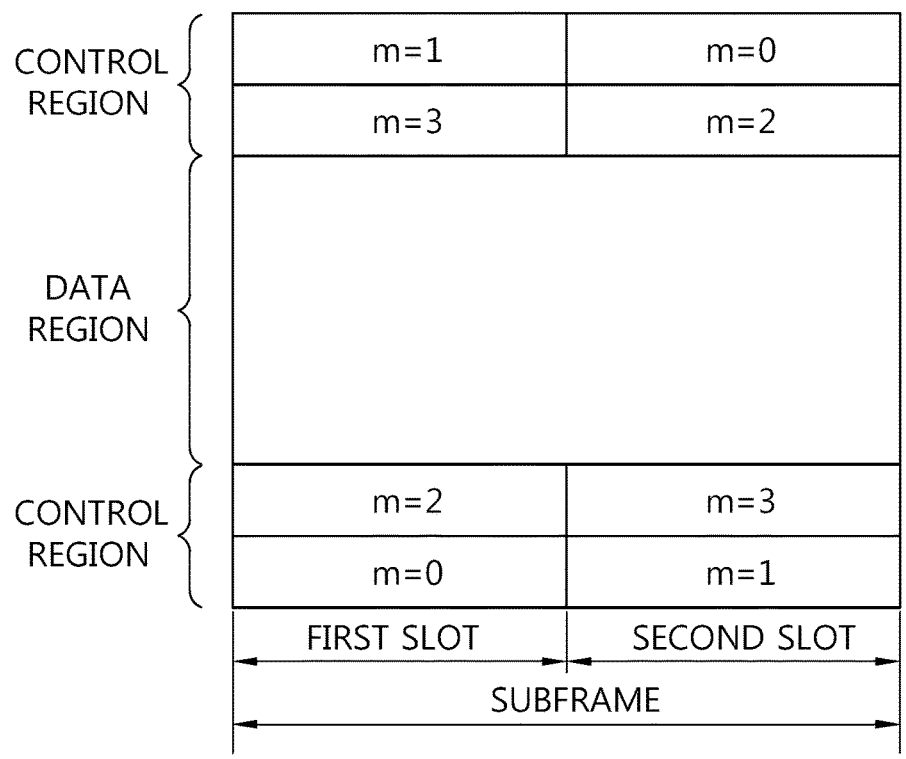
FIG. 5 illustrates the architecture of a downlink subframe.
Figure 5:
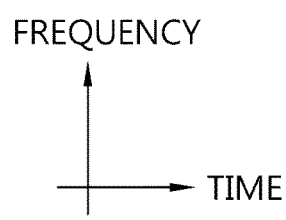

FIG. 5 Illustrates the Architecture of an Uplink Sub-Frame in 3GPP LTE.

Referring to FIG. 5, the uplink sub-frame may be separated into a control region and a data region in the frequency domain. The control region is assigned a PUCCH (physical uplink control channel) for transmission of uplink control information. The data region is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information. For example, the control information multiplexed with the data may include a CQI, a PMI (precoding matrix indicator), an HARQ, and an RI (rank indicator). Or, the uplink data may consist only of control information.

Figure 6:
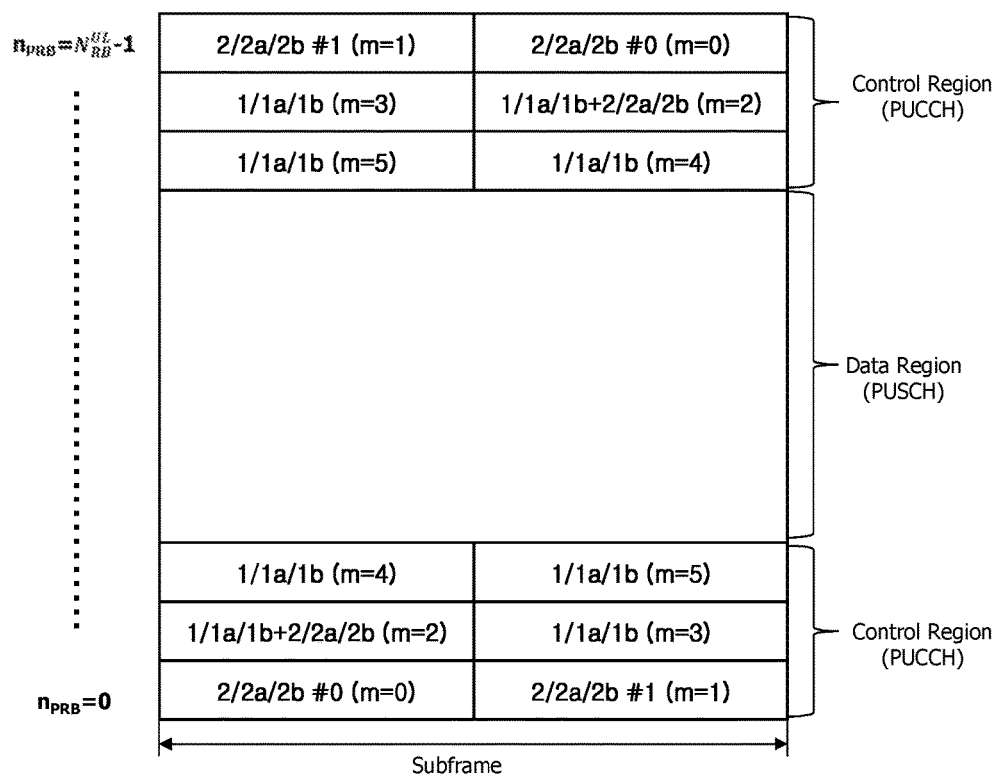
FIG. 6 is an exemplary diagram illustrating a transmission region based on the PUCCH formation.

FIG. 6 Illustrates the PUCCH and the PUSCH on an Uplink Subframe.

PUCCH formats will be described with reference to FIG. 6.

The PUCCH format 1 carries the scheduling request (SR). In this case, an on-off keying (OOK) mode may be applied. The PUCCH format 1a carries acknowledgement/non-acknowledgement (ACK/NACK) modulated in a binary phase shift keying (BPSK) mode with respect to one codeword. The PUCCH format 1b carries ACK/NACK modulated in a quadrature phase shift keying (QPSK) mode with respect to two codewords. The PUCCH format 2 carries a channel quality indicator (CQI) modulated in the QPSK mode. The PUCCH formats 2a and 2b carry the CQI and the ACK/NACK.

A table given below carries the PUCCH formats.

TABLE 1

| Format | Modulation mode | Total bit count per subframe | Description |
|---|---|---|---|
| Format 1 | Undecided | Undecided | Scheduling request (SR) |
| Format 1a | BPSK | 1 | ACK/NACK of 1-bit HARQ, scheduling request (SR) may be present or not present |
| Format 1b | QPSK | 2 | ACK/NACK of 2-bit HARQ, scheduling request (SR) may be present or not present |
| Format 2 | QPSK | 20 | In case of extended CP, CSI and 1-bit or 2-bit HARQ ACK/NACK |
| Format 2a | QPSK + BPSK | 21 | CSI and 1-bit HARQ ACK/NACK |
| Format 2b | QPSK + BPSK | 22 | CSI and 2-bit HARQ ACK/NACK |
| Format 3 | QPSK | 48 | Multiple ACKs/NACKs, CSI, and scheduling request (SR) may be present or not present |

Each PUCCH format is transmitted while being mapped to a PUCCH region. For example, the PUCCH format 2/2a/2b is transmitted while being mapped to resource blocks (m=0 and 1) of band edges assigned to the UE. A mixed PUCCH RB may be transmitted while being mapped to a resource block (e.g., m=2) adjacent to the resource block to which the PUCCH format 2/2a/2b is assigned in a central direction of the band. The PUCCH format 1/1a/1b in which the SR and the ACK/NACK are transmitted may be disposed in a resource block in which m=4 or m=5. The number ($N(2)RB$) of resource blocks which may be used in the PUCCH format 2/2a/2b in which the CQI is transmitted may be indicated to the UE through a broadcasted signal.

<Uplink Reference Signal>

Hereinafter, an uplink reference signal will be described.

The reference signal is generally transported in sequence. As the sequence of the reference signal, a predetermined sequence may be used without a particular limit. As the reference signal sequence, a sequence (PSK-based computer generated sequence) generated through a phase shift keying (PSK) based computer may be used. Examples of the PSK include binary phase shift keying (BPSK), quadrature phase shift keying (QPSK), and the like. Alternatively, as the reference signal sequence, a constant amplitude zero auto-correlation (CAZAC) sequence may be used. Examples of the CAZAC sequence include a zadoff-chu (ZC) based sequence, a ZC sequence with cyclic extension, a ZC sequence with truncation, and the like. Alternatively, as the reference signal sequence, a pseudo-random (PN) sequence may be used. Examples of the PN sequence include an m-sequence, a sequence generated through the computer, a gold sequence, a Kasami sequence, and the like. Further, as the reference signal sequence, a cyclically shifted sequence may be used.

The uplink reference signal may be divided into the demodulation reference signal (DMRS) and the sounding reference signal (SRS). The DMRS is a reference signal used in the channel estimation for demodulating a received signal. The DMRS may be associated with transmission of a PUSCH or PUCCH. The SRS is a reference signal which the terminal transmits to a base station for uplink scheduling. The base station estimates an uplink channel through the received sounding reference signal and uses the estimated uplink channel in the uplink scheduling. The SRS is not associated with transmission of the PUSCH or PUCCH. The same type of base sequence may be used for the DMRS and the SRS. Meanwhile, precoding applied to the DMRS in uplink multi-antenna transmission may be the same as precoding applied to the PUSCH. Cyclic shift separation is a primary scheme that multiplexes the DMRS. In the 3GPP LTE-A system, the SRS may not be precoded and further, may an antenna specific reference signal.

The reference signal sequence $r_{u,v}^{(\alpha)}(n)$ may be defined based on a base sequence $b_{u,v}(n)$ and a cyclic shift a by an equation given below.

$$r_{u,v}^{(\alpha)}(n) = e^{j\alpha n} b_{u,v}(n), 0 \leq n < M_{sc}^{RS} \quad \text{[Equation 1]}$$

In Equation 1, $M_{sc}^{RS} = m*N_{sc}^{RB}$ ($1 \leq m \leq N_{RB}^{max,UL}$) represents the length of the reference signal sequence. $N_{sc}^{RB}$ represents the size of a resource block represented by the number of subcarriers in the frequency domain and $N_{RB}^{max,UL}$ represents a maximum value of an uplink bandwidth represented by the multiple of $N_{sc}^{RB}$. A plurality of reference signal sequences may be defined by differently applying a which is the cyclic shift value from one base sequence.

The base sequence $b_{u,v}(n)$ is divided into a plurality of groups and in this case, $u \in \{0, 1, \ldots, 29\}$ represents a group number and v represents a base sequence number in a group. The base sequence depends on the length ($M_{sc}^{RS}$) of the base sequence. Each group includes one base sequence (v=0) in which the length is $M_{sc}^{RS}$ with respect to m of $1 \leq m \leq 5$ and includes two base sequences (v=0, 1) in which the length is $M_{sc}^{RS}$ with respect to m of $6 \leq m \leq n_{RB}^{max,UL}$. A sequence group number u and a base sequence number v in the group may vary depending on a time like group hopping or sequence hopping.

When the length of the reference signal sequence is $3N_{sc}^{RB}$ or more, the base sequence may be defined by an equation given below.

$$b_{u,v}(n) = x_q(n \bmod N_{ZC}^{RS}), 0 \leq n < M_{sc}^{RS} \quad \text{[Equation 2]}$$

In the above equation, q represents a root index of a Zadoff-Chu (ZC) sequence. $N_{ZC}^{RS}$ represent the length of the ZC sequence may be given as a prime number smaller than $M_{sc}^{RS}$. The ZC sequence having the root index of q may be defined by Equation 4.

$$x_q(m) = e^{-j\frac{\pi q m(m+1)}{N_{ZC}^{RS}}}, 0 \leq m \leq N_{ZC}^{RS} - 1 \quad \text{[Equation 3]}$$

In the above equation, q may be given by an equation given below.

$$q = \lfloor \bar{q} + \tfrac{1}{2} \rfloor + v \cdot (-1)^{\lfloor 2\bar{q} \rfloor}$$

$$\bar{q} = N_{ZC}^{RS} \cdot (u+1)/31 \quad \text{[Equation 4]}$$

When the length of the reference signal sequence is $3N_{sc}^{RB}$ or less, the base sequence may be defined by an equation given below.

$$b_{u,v}(n) = e^{j\phi(n)\pi/4}, 0 \leq n \leq M_{sc}^{RS} - 1 \quad \text{[Equation 5]}$$

A table given below shows an example in which $\varphi(n)$ is defined when $M_{sc}^{RS} = N_{sc}^{RB}$.

TABLE 2

| | $\varphi(0), \ldots, \varphi(11)$ | | | | | | | | | | | |
|---|---|---|---|---|---|---|---|---|---|---|---|---|
| 0 | -1 | 1 | 3 | -3 | 3 | 3 | 1 | 1 | 3 | 1 | -3 | 3 |
| 1 | 1 | 1 | 3 | 3 | 3 | -1 | 1 | -3 | -3 | 1 | -3 | 3 |
| 2 | 1 | 1 | -3 | -3 | -3 | -1 | -3 | -3 | 1 | -3 | 1 | -1 |
| 3 | -1 | 1 | 1 | 1 | 1 | -1 | -3 | -3 | 1 | -3 | 3 | -1 |
| 4 | -1 | 3 | 1 | -1 | 1 | -1 | -3 | -1 | 1 | -1 | 1 | 3 |
| 5 | 1 | -3 | 3 | -1 | -1 | 1 | 1 | -1 | -1 | 3 | -3 | 1 |
| 6 | -1 | 3 | -3 | -3 | -3 | 3 | 1 | -1 | 3 | 3 | -3 | 1 |
| 7 | -3 | -1 | -1 | -1 | 1 | -3 | 3 | -1 | 1 | -3 | 3 | 1 |
| 8 | 1 | -3 | 3 | 1 | -1 | -1 | -1 | 1 | 1 | 3 | -1 | 1 |
| 9 | 1 | -3 | -1 | 3 | 3 | -1 | -3 | 1 | 1 | 1 | 1 | 1 |
| 10 | -1 | 3 | -1 | 1 | 1 | -3 | -3 | -1 | -3 | -3 | 3 | -1 |
| 11 | 3 | 1 | -1 | -1 | 3 | 3 | -3 | 1 | 3 | 1 | 3 | 3 |
| 12 | 1 | -3 | 1 | 1 | -3 | 1 | 1 | 1 | -3 | -3 | -3 | 1 |
| 13 | 3 | 3 | -3 | 3 | -3 | 1 | 1 | 3 | -1 | -3 | 3 | 3 |
| 14 | -3 | 1 | -1 | -3 | -1 | 3 | 1 | 3 | 3 | 3 | -1 | 1 |
| 15 | 3 | -1 | 1 | -3 | -1 | -1 | 1 | 1 | 3 | 1 | -1 | -3 |
| 16 | 1 | 3 | 1 | -1 | 1 | 3 | 3 | 3 | -1 | -1 | 3 | -1 |
| 17 | -3 | 1 | 1 | 3 | -3 | 3 | -3 | -3 | 3 | 1 | 3 | -1 |
| 18 | -3 | 3 | 1 | 1 | -3 | 1 | -3 | -3 | -1 | -1 | 1 | -3 |
| 19 | -1 | 3 | 1 | 3 | 1 | -1 | -1 | 3 | -3 | -1 | -3 | -1 |
| 20 | -1 | -3 | 1 | 1 | 1 | 1 | 3 | 1 | -1 | 1 | -3 | -1 |
| 21 | -1 | 3 | -1 | 1 | -3 | -3 | -3 | -3 | -3 | 1 | -1 | -3 |
| 22 | 1 | 1 | -3 | -3 | -3 | -3 | -1 | 3 | -3 | 1 | -3 | 3 |
| 23 | 1 | 1 | -1 | -3 | -1 | -3 | 1 | -1 | 1 | 3 | -1 | 1 |
| 24 | 1 | 1 | 3 | 1 | 3 | 3 | -1 | 1 | -1 | -3 | -3 | 1 |
| 25 | 1 | -3 | 3 | 3 | 1 | 3 | 3 | 1 | -3 | -1 | -1 | 3 |
| 26 | 1 | 3 | -3 | -3 | 3 | -3 | 1 | -1 | -1 | 3 | -1 | -3 |
| 27 | -3 | -1 | -3 | -1 | -3 | 3 | 1 | -1 | 1 | 3 | -3 | -3 |
| 28 | -1 | 3 | -3 | 3 | -1 | 3 | 3 | -3 | 3 | 3 | -1 | -1 |
| 29 | 3 | -3 | -3 | -1 | -1 | -3 | -1 | 3 | -3 | 3 | 1 | -1 |

A table given below shows an example in which $\varphi(n)$ is defined when $M_{sc}^{RS} = 2 \cdot N_{sc}^{RB}$.

TABLE 3

| | $\varphi(0), \ldots, \varphi(23)$ | | | | | | | | | | | | | | | | | | | | | | | |
|---|---|---|---|---|---|---|---|---|---|---|---|---|---|---|---|---|---|---|---|---|---|---|---|---|
| 0 | -1 | 3 | 1 | -3 | 3 | -1 | 1 | 3 | -3 | 3 | 1 | 3 | -3 | 3 | 1 | 1 | -1 | 1 | 3 | -3 | 3 | -3 | -1 | -3 |
| 1 | -3 | 3 | -3 | -3 | -3 | 1 | -3 | -3 | 3 | -1 | 1 | 1 | 1 | 3 | 1 | -1 | 3 | -3 | -3 | 1 | 3 | 1 | 1 | -3 |
| 2 | 3 | -1 | 3 | 3 | 1 | 1 | -3 | 3 | 3 | 3 | 3 | 1 | -1 | 3 | -1 | 1 | 1 | -1 | -3 | -1 | -1 | 1 | 3 | 3 |
| 3 | -1 | -3 | 1 | 1 | 3 | -3 | 1 | 1 | -3 | -1 | -1 | 1 | 3 | 1 | 3 | 1 | -1 | 3 | 1 | 1 | -3 | -1 | -3 | -1 |
| 4 | -1 | -1 | -1 | -3 | -3 | -1 | 1 | 1 | 3 | 3 | -1 | 3 | -1 | 1 | -1 | -3 | 1 | -1 | -3 | -3 | 1 | -3 | -1 | -1 |
| 5 | -3 | 1 | 1 | 3 | -1 | 1 | 3 | 1 | -3 | 1 | -3 | 1 | 1 | -1 | -1 | 3 | -1 | -3 | 3 | -3 | -3 | -3 | 1 | 1 |
| 6 | 1 | 1 | -1 | -1 | 3 | -3 | -3 | 3 | -3 | 1 | -1 | -1 | 1 | -1 | 1 | 1 | -1 | -3 | -1 | 1 | -1 | 3 | -1 | -3 |
| 7 | -3 | 3 | 3 | -1 | -1 | -3 | -1 | 3 | 1 | 3 | 1 | 3 | 1 | 1 | -1 | 3 | 1 | -1 | 1 | 3 | -3 | -1 | -1 | 1 |
| 8 | -3 | 1 | 3 | -3 | 1 | -1 | -3 | 3 | -3 | 3 | -1 | -1 | -1 | -1 | 1 | -3 | -3 | -3 | 1 | -3 | -3 | -3 | 1 | -3 |
| 9 | 1 | 1 | -3 | 3 | 3 | -1 | -3 | -1 | 3 | -3 | 3 | 3 | 3 | -1 | 1 | 1 | -3 | 1 | -1 | 1 | 1 | -3 | 1 | 1 |
| 10 | -1 | 1 | -3 | -3 | 3 | -1 | 3 | -1 | -1 | -3 | -3 | -3 | -1 | -3 | -3 | 1 | -1 | 1 | 3 | 3 | -1 | 1 | -1 | 3 |
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | -3 | 3 | 3 | -1 | -3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | 3 | 1 | -1 | 1 | -3 | 1 | -3 | 1 | 1 | -3 | -1 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

Hopping of the reference signal may be applied as described below.

$$v = \begin{cases} c(n_s) & \text{if group hopping is disabled and sequence hopping is enabled} \\ 0 & \text{otherwise} \end{cases} \quad \text{[Equation 9]}$$

A sequence group number u of slot $n_s$ may be defined based on a group hopping pattern $f_{gh}(n_s)$ and a sequence shift pattern $f_{ss}$ by an equation given below.

$$u = (f_{gh}(n_s) + f_{ss}) \mod 30 \quad \text{[Equation 6]}$$

17 different group hopping patterns and 30 different sequence shift patterns may exist. Group hopping may be applied or not applied by a group-hopping-enabled parameter which is a cell specific parameter provided by the higher layer. Further, the group hopping for the PUSCH may not be applied to specific UE by a disable-sequence-group-hopping parameter which is a UE specific parameter. The PUCCH and the PUSCH may have the same group hopping pattern and different sequence shift patterns.

The group hopping pattern $f_{gh}(n_s)$ is the same with respect to the PUSCH and the PUCCH and may be defined by an equation given below.

$$f_{gh}(n_s) = \begin{cases} 0 & \text{if group hopping is disabled} \\ \left(\sum_{i=0}^{7} c(8n_s + i) \cdot 2^i\right) \mod 30 & \text{if group hopping is enabled} \end{cases} \quad \text{[Equation 7]}$$

In the above equation, c(i) as an imitation pseudo-random sequence which is a PN sequence may be defined by a gold sequence having a length of −31. An equation given below shows one example of the gold sequence c(n).

$$c(n) = (x_1(n+N_c) + x_2(n+N_c)) \mod 2$$

$$x_1(n+31) = (x_1(n+3) + x_1(n)) \mod 2$$

$$x_2(n+31) = (x_2(n+3) + x_2(n+2) + x_2(n+1) + x_2(n)) \mod 2 \quad \text{[Equation 8]}$$

Herein, Nc=1600, $x_1(i)$ represents a 1 m-th sequence, and $x_2(i)$ represents a 2 m-th sequence. The imitation pseudo-number sequence generator may be initialized to $$c_{init} = \left\lfloor \frac{N_{ID}^{cell}}{30} \right\rfloor$$

at the beginning of each radio frame.

Definition of the sequence shift pattern $f_{ss}$ may be different with respect to the PUCCH and the PUSCH. The sequence shift pattern of the PUCCH may be given as $f_{ss}^{PUCCH} = N_{ID}^{cell} \mod 30$. The sequence shift pattern of the PUSCH may be given as $f_{ss}^{PUSCH} = (f_{ss}^{PUCCH} + \Delta_{ss}) \mod 30$ and $\alpha_{ss} \in \{0, 1, \ldots, 29\}$ may be configured by the higher layer.

The sequence hopping may be applied only to a reference signal sequence having a length longer than $6N_{sc}^{RB}$. With respect to a reference signal sequence having a length shorter than $6N_{sc}^{RB}$, the base sequence number is given as v=0 in the base sequence group. With respect to the reference signal sequence having the length longer than $6N_{sc}^{RB}$, the base sequence number v in the base sequence group in slot $n_s$ may be defined by Equation 10.

c(i) may be expressed by an example of Equation 8 given above. The sequence hopping may be applied or not applied by a sequence-hopping-enabled parameter which is a cell specific parameter provided by the higher layer. Further, the sequence hopping for the PUSCH may not be applied to specific UE by the disable-sequence-group-hopping parameter which is the UE specific parameter. The imitation pseudo-number sequence generator may be initialized to $$c_{init} = \left\lfloor \frac{N_{ID}^{cell}}{30} \right\rfloor \cdot 2^5 + f_{ss}^{PUSCH}$$

at the beginning of each radio frame.

A PUSCH DMRS sequence $r_{PUSCH}^{(\lambda)}(\cdot)$ depending on a layer $\lambda(0, 1, \ldots, \gamma-1)$ may be defined by Equation 11.

$$r_{PUSCH}^{(\lambda)}(m \cdot M_{sc}^{RS} + n) = w^{(\lambda)}(m) r_{u,v}^{(\alpha_\lambda)}(n) \quad \text{[Equation 10]}$$

In the above equation, m=0, 1, ... and n=0, ..., $M_{sc}^{RS}$−1. $M_{sc}^{RS} = M_{sc}^{PUSCH}$. An orthogonal sequence $w^{(\lambda)}(m)$ may be determined according to a table to be described below.

In the slot $n_s$, the cyclic shift may be given as $\alpha = 2\pi n_{cs}/12$ and $n_{cs}$ may be defined by an equation given below.

$$n_{cs,\lambda} = (n_{DMRS}^{(1)} + n_{DMRS,\lambda}^{(2)} + n_{PN}(n_s)) \mod 12 \quad \text{[Equation 11]}$$

In the above equation, $n^{(1)}_{DMRS}$ may be determined according to a cyclicShift parameter provided by the higher layer. A table given below shows an example of $n^{(1)}_{DMRS}$ determined according to the cyclicShift parameter.

TABLE 4

| Parameter | $n^{(1)}_{DMRS}$ |
|---|---|
| 0 | 0 |
| 1 | 2 |
| 2 | 3 |
| 3 | 4 |
| 4 | 6 |
| 5 | 8 |
| 6 | 9 |
| 7 | 10 |

Referring back to the above equation, $n^{(2)}_{DMRS,\lambda}$ may be determined by a DMRS cyclic shift field in DCI format 0 for the transport block depending on corresponding PUSCH transmission. A table given below shows an example of $n^{(2)}_{DMRS,\lambda}$ determined according to DMRS cyclic shift field.

TABLE 5

| DMRS cyclic shift field | $n^{(2)}_{DMRS,\lambda}$ | | | | $[w^{(\lambda)}(0) \; w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 -1] | [1 -1] |
| 001 | 6 | 0 | 9 | 3 | [1 -1] | [1 -1] | [1 1] | [1 1] |
| 010 | 3 | 9 | 6 | 0 | [1 -1] | [1 -1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 -1] | [1 -1] | [1 -1] | [1 -1] |
| 110 | 10 | 4 | 1 | 7 | [1 -1] | [1 -1] | [1 -1] | [1 -1] |
| 111 | 9 | 3 | 0 | 6 | [1 1] | [1 1] | [1 -1] | [1 -1] |

$n_{PN}(n_s)$ may be defined by an equation given below.

$$n_{PN}(n_s) = \sum_{i=0}^{7} c(8N_{symb}^{UL} \cdot n_s + i) \cdot 2^i \quad \text{[Equation 12]}$$

c(i) may be expressed by the example of Equation 8 given above and applied for each cell of c(i). The imitation pseudo-number sequence generator may be initialized to $$c_{init} = \left\lfloor \frac{N_{ID}^{cell}}{30} \right\rfloor \cdot 2^5 + f_{ss}^{PUSCH}$$

at the beginning of each radio frame.

The vector of the reference signal may be precoded by an equation given below.

$$\begin{bmatrix} \tilde{r}_{PUSCH}^{(0)} \\ \vdots \\ \tilde{r}_{PUSCH}^{(P-1)} \end{bmatrix} = W \begin{bmatrix} r_{PUSCH}^{(0)} \\ \vdots \\ r_{PUSCH}^{(\upsilon-1)} \end{bmatrix} \quad \text{[Equation 13]}$$

In the above equation, P represents the number of antenna ports used for the PUSCH transmission. W represents a precoding matrix. With respect to the PUSCH transmission using the single antenna port, P=1, W=1, and γ=1. Further, with respect to spatial multiplexing, P=2 or 4.

With respect to each antenna port used for the PUSCH transmission, the DMRS sequence is multiplied by an amplitude scaling factor $\beta_{PUSCH}$ and sequentially mapped to the resource block. A set of physical resource blocks used for the mapping is the same as the set of physical resource blocks used for the PUSCH transmission. In the subframe, the DMRS sequence may be first mapped to the resource element in a direction in which the DMRS sequence increases in the frequency domain and thereafter, in a direction in which the slot number increases. The DMRS sequence may be mapped to a fourth SC-FDMA symbol (SC-FDMA symbol 3) in the case of the normal CP and a third SC-FDMA symbol (SC-FDMA symbol 2) in the case of the extension CP.

Figure 7A:
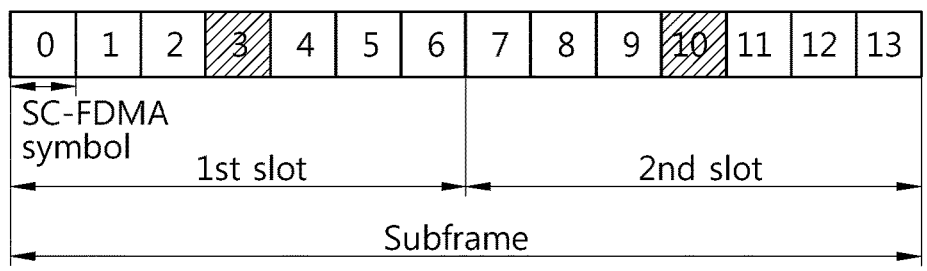
FIGS. 7a and 7b are one example of a subframe in which a DMRS for a PUSCH is transmitted.
Figure 7A:
Figure 7B:
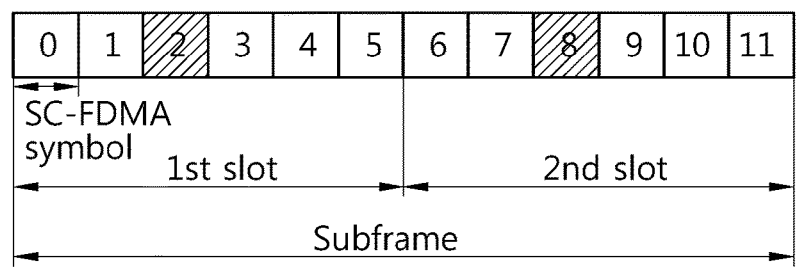
Figure 7B:

FIGS. 7a and 7b are One Example of a Subframe in which a DMRS for a PUSCH is Transmitted.

The structure of the subframe in FIG. 7a shows a case of the normal CP. The subframe includes the first slot and the second slot. Each of the first slot and the second slot includes 7 SC-FDMA symbols. Symbol indexes of 0 to 13 are granted to 14 SC-FDMA symbols in the subframe. The reference signal may be transmitted through the SC-FDMA symbols having symbol indexes 3 and 10. The reference signal may be transmitted by using the sequence. The Zadoff-Chu (ZC) sequence may be used as the reference signal sequence and various ZC sequences may be generated according to a root index and a cyclic shift value. The base station allocates different cyclic shift values to the terminal to estimate channels of a plurality of terminals through an orthogonal sequence or quasi-orthogonal sequence. Locations of the frequency domains occupied by the reference signal in may be the same as each other or different from each other in two slots in the subframe. In two slots, the same reference signal sequence is used. Data may be transmitted through the residual SC-FDMA symbols other than the SC-FDMA symbol in which the reference signal is transmitted.

The structure of the subframe in FIG. 7b shows a case of the extension CP. The subframe includes the first slot and the second slot. Each of the first slot and the second slot includes 6 SC-FDMA symbols. Symbol indexes of 0 to 11 are granted to 12 SC-FDMA symbols in the subframe. The reference signal is transmitted through the SC-FDMA symbols having symbol indexes 2 and 8. The data is transmitted through the residual SC-FDMA symbols other than the SC-FDMA symbol in which the reference signal is transmitted.

<Carrier Aggregation>

Hereinafter, a carrier aggregation (CA) system will be described.

The carrier aggregation (CA) system means aggregating multiple component carriers (CCs). By the carrier aggregation, the existing meaning of the cell is changed. According to the carrier aggregation, the cell may mean a combination of a downlink component carrier and an uplink component carrier or a single downlink component carrier.

Further, in the carrier aggregation, the cell may be divided into a primary cell, secondary cell, and a serving cell. The primary cell means a cell that operates at a primary frequency and means a cell in which the UE performs an initial connection establishment procedure or a connection reestablishment procedure with the base station or a cell indicated by the primary cell during a handover procedure. The secondary cell means a cell that operates at a secondary frequency and once an RRC connection is established, the secondary cell is configured and is used to provide an additional radio resource.

As described above, the carrier aggregation system may support a plurality of component carriers (CC), that is, a plurality of serving cells unlike a single carrier system.

The carrier aggregation system may support cross-carrier scheduling. The cross-carrier scheduling is a scheduling method that may perform resource allocation of the PDSCH transmitted through another component carrier through the PDCCH transmitted through a specific component carrier and/or resource allocation of the PUSCH transmitted through other component carrier other than the component carrier fundamentally linked with the specific component carrier.

<Introduction of Small Cell>

Meanwhile, in a next-generation mobile communication system, it is anticipated that a small cell having a small cell coverage radius will be added into coverage of the existing cell and it is anticipated that the small cell will process more traffic. Since the existing cell has larger than the small cell, the existing call may be called a macro cell. Hereinafter, it will be described with reference to FIG. 10.

Figure 8:
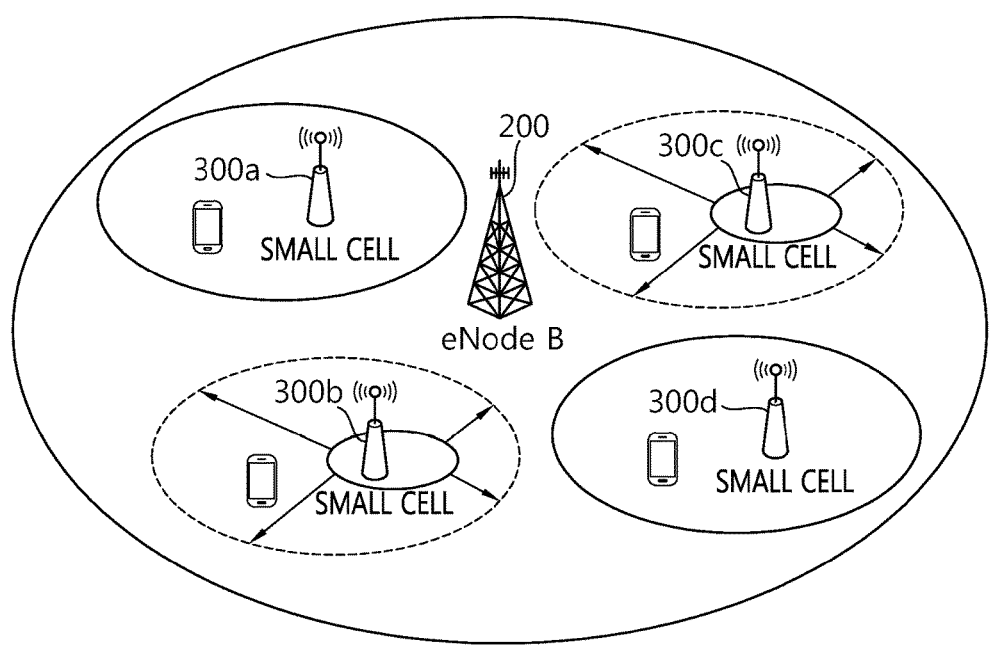
FIG. 8 is a diagram illustrating an environment of heterogeneous networks of a macro cell and a small cell which may become a next-generation wireless communication system.

FIG. 8 is a Diagram Illustrating an Environment of Heterogeneous Networks of a Macro Cell and a Small Cell which May Become a Next-Generation Wireless Communication System.

Referring to FIG. 8, a heterogeneous-network environment is shown, in which a macro cell by the existing base station 200 overlaps with a small cell by one or more small base stations 300a, 300b, 300c, and 300d. Since the existing base station provides the larger coverage than the small base station, the existing base station may be called a macro base station (macro eNodeB, or MeNB). In the present specification, terms such as the macro cell and the macro base station will be mixedly used. The UE that accesses the macro cell 200 may be referred to as macro UE. The macro UE receives a downlink signal from the macro base station and transmits an uplink signal to the macro base station.

In the heterogeneous networks, the macro cell is configured as a primary cell (Pcell) and the small cell is configured as a secondary cell (Scell) to fill a coverage gap of the macro cell. Further, the small cell is configured as the primary cell (Pcell) and the macro cell is configured as the secondary cell (Scell) to boost overall performance.

Meanwhile, the small cell may use a frequency band assigned to current LTE/LTE-A or use a higher frequency band (e.g., a band of 3.5 GHz or higher).

On the other hand, in a next LTE-A system, it is considered that the small cell may not be independently used and the small cell may be used only as a macro-assisted small cell which may be used under assistance of the macro cell.

The small cells 300a, 300b, 300c, and 300d may have similar channel environments to each other and since the small cells 300a, 300b, 300c, and 300d are positioned at distances which are proximate to each other, interference among the small cells may be a large issue.

Figure 9:
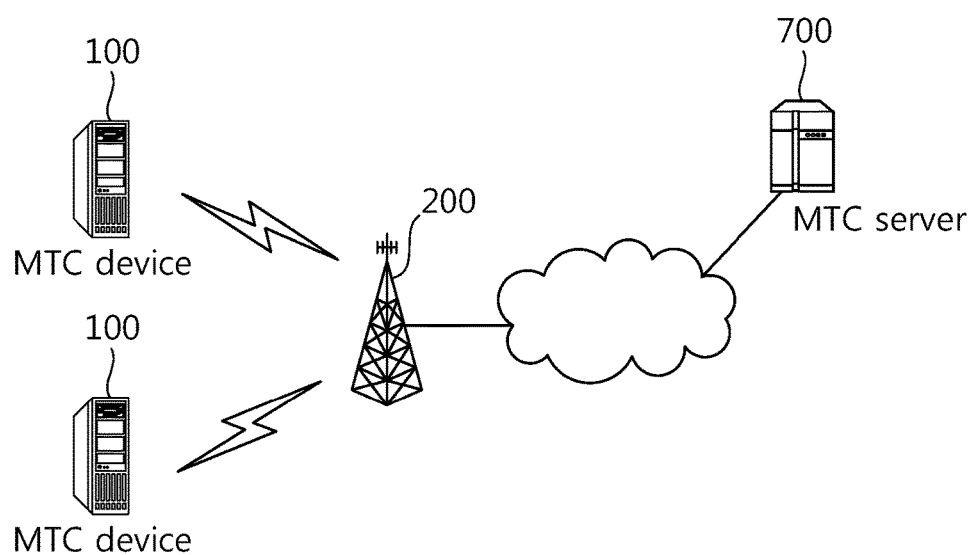
FIG. 9 illustrates one example of machine type communication (MTC).

In order to reduce an interference influence, the small cells 300b and 300c may extend or reduce coverage thereof. The extension and reduction of the coverage is referred to as cell breathing. For example, as illustrated in FIG. 9, the small cells 300b and 300c may be turned on or off according to a situation.

On the other hand, the small cell may use the frequency band assigned to the current LTE/LTE-A or use the higher frequency band (e.g., the band of 3.5 GHz or higher).

<Machine Type Communication (MTC)>

Meanwhile, hereinafter, the MTC will be described.

FIG. 9 Illustrates One Example of Machine Type Communication (MTC).

The machine type communication (MTC) represents information exchange through between MTC devices 100 through a base station 200 or information exchange between the MTC device 100 and an MTC server 700 through the base station, which does not accompany human interaction.

The MTC server 700 is an entity which communicates with the MTC device 100. The MTC server 700 executes an MTC application and provides an MTC specific service to the MTC device.

The MTC device 100 as a wireless device providing the MTC may be fixed or mobile.

The service provided through the MTC has discrimination from a service in communication in which human intervenes in the related art and includes various categories of services including tracking, metering, payment, a medical field service, remote control, and the like. In more detail, the service provided through the MTC may include electric meter reading, water level measurement, utilization of a monitoring camera, reporting of an inventory of a vending machine, and the like.

As peculiarities of the MTC device, since a transmission data amount is small and uplink/downlink data transmission/reception often occurs, it is efficient to decrease manufacturing cost of the MTC device and reduce battery consumption according to the low data transmission rate. The MTC device is characterized in that mobility is small, and as a result, the MTC device is characterized in that a channel environment is not almost changed.

Meanwhile, the MTC is also called Internet of Things (IoT). Accordingly, the MTC device may be called an IoT device.

Figure 10A:
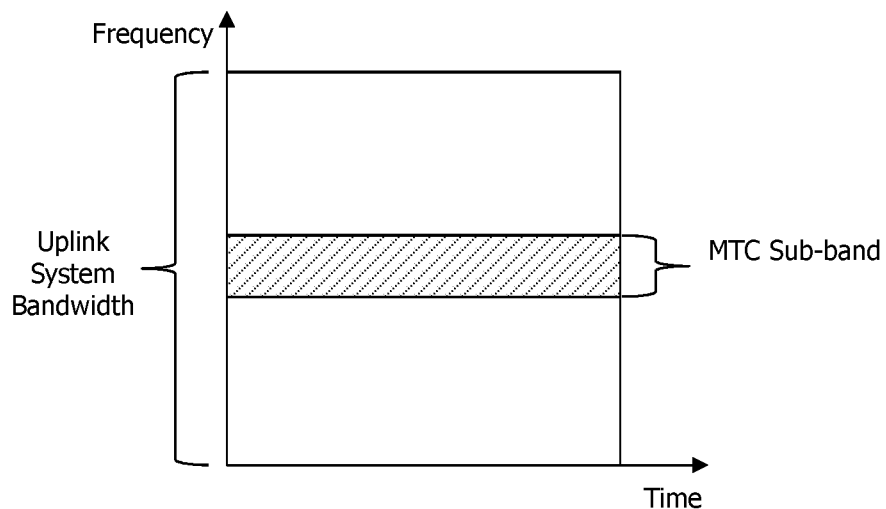
FIGS. 10a and 10b are exemplary diagrams illustrating not the entirety of an uplink system band but a partial subband of the MTC device.
Figure 10B:
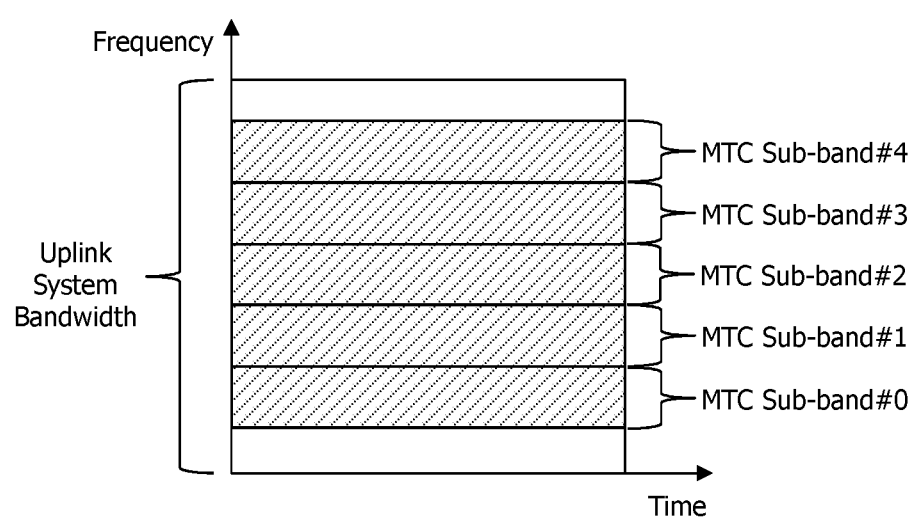

FIGS. 10a and 10b are Exemplary Diagrams Illustrating not the Entirety of an Uplink System Band but a Partial Subband of the MTC Device.

As one method for low cost of the MTC device, the MTC device may use a subband at, for example, approximately 1.4 MHz regardless of an uplink system bandwidth of the cell as illustrated in FIG. 10a.

In this case, a region of the subband in which the MTC device operates may be positioned at a central area (for example, 6 central PRBs) of the uplink system bandwidth of the cell as illustrated in FIG. 9a.

Alternatively, as illustrated in FIG. 10b, multiple subbands of the MTC device are provided in one subframe for multiplexing of the MTC devices in the subframe, and as a result, the MTC devices may have different subbands. In this case, a majority of MTC devices may have other subbands other than the central area (for example, 6 central PRBs) of the system band of the cell.

Figure 11A:
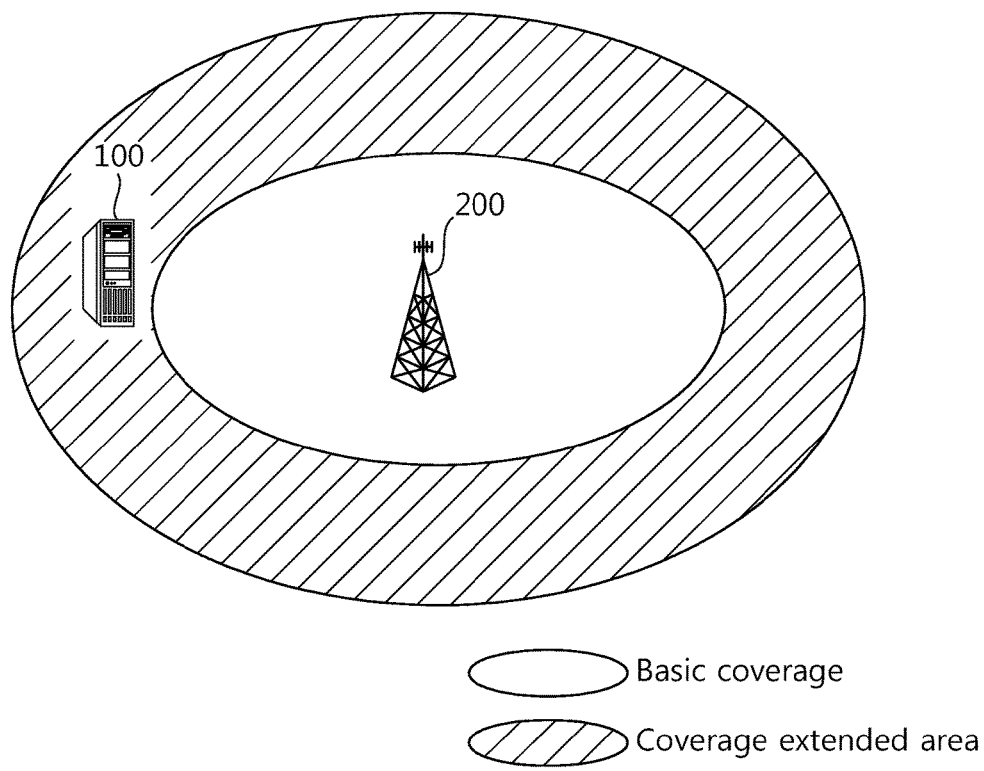
FIG. 11a is an example of cell coverage enhancement for an MTC device.

FIG. 11a is an Example of Cell Coverage Enhancement for an MTC Device.

In recent years, it is considered that cell coverage enhancement or coverage enhancement (CE) of the base station extends for the MTC device 100 and various techniques for the cell coverage enhancement are discussed.

However, in the case where the coverage of the cell extends, when the MTC device positioned in the coverage enhancement transmits an uplink channel, the base station undergoes a difficulty in receiving the uplink channel.

Figure 11B:
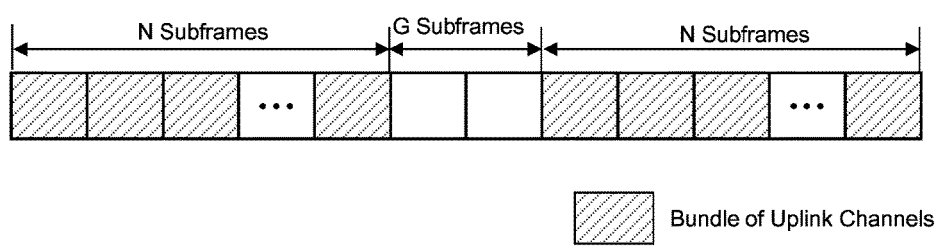
FIG. 11b is an exemplary diagram illustrating an example of transmitting a bundle of uplink channels.

FIG. 11b is an Exemplary Diagram Illustrating an Example of Transmitting a Bundle of Uplink Channels.

As known with reference to FIG. 11b, the MTC device positioned in the coverage enhancement area repeatedly transmits the uplink channel (for example, the PUCCH and/or PUSCH) on multiple subframes (for example, N subframes). As described above, the uplink channels which are repeated on the multiple subframes are called a bundle of the uplink channels.

Meanwhile, the base station receives the bundle of the uplink channels on the multiple subframes and decodes a part or the entirety of the bundle to increase decoding success rate.

Meanwhile, since the MTC device may exist at a location where the signal is weak, performance may deteriorate when the base station estimates the channel by using the DMRS transmitted by the MTC device.

In order to solve the performance deterioration, it may be considered that the MTC device repeatedly transmits the DMRS. However, since a channel situation has characteristics that the channel situation may vary with time, there may be a limit in improving channel estimation performance of the base station only by repeatedly transmitting the DMRS by the MTC device.

<Disclosure of Present Specification>

Therefore, the disclosure of the present specification has been made in an effort to present a method that solves the problem.

In detail, one disclosure of the present specification suggests increasing the density (by the unit of single or multiple slots/subframes/radio frames) of the reference signal for the uplink channel. In more detail, one disclosure of the present specification proposes a method for increasing the density of the DMRS for demodulating the PUSCH. In addition, one disclosure of the present specification suggests a method that handles issues (e.g., SRS collisions, etc.) which may occur as the density of the DMRS increases.

Hereinafter, the method is described based on transmission of the PUSCH, but the corresponding description may be applied even to another channel (including even the downlink channel).

I. Method for Enhancing Reference Signal for Demodulating PUSCH

In the existing LTE Rel-11 system, the DMRS for demodulating the PUSCH is mapped to OFDMA (SC-FDMA) symbol #3 and OFDMA (SC-FDMA) symbol #10 based on the normal CP and mapped to OFDMA (SC-FDMA) symbol #2 and OFDMA (SC-FDMA) symbol #8 based on the extended CP. As one method for increasing the density of the reference signal for demodulating the PUSCH, it may be considered that the existing DMRS is reused and an additional reference signal (hereinafter, referred to as to 'extended DMRS').

Figure 12:
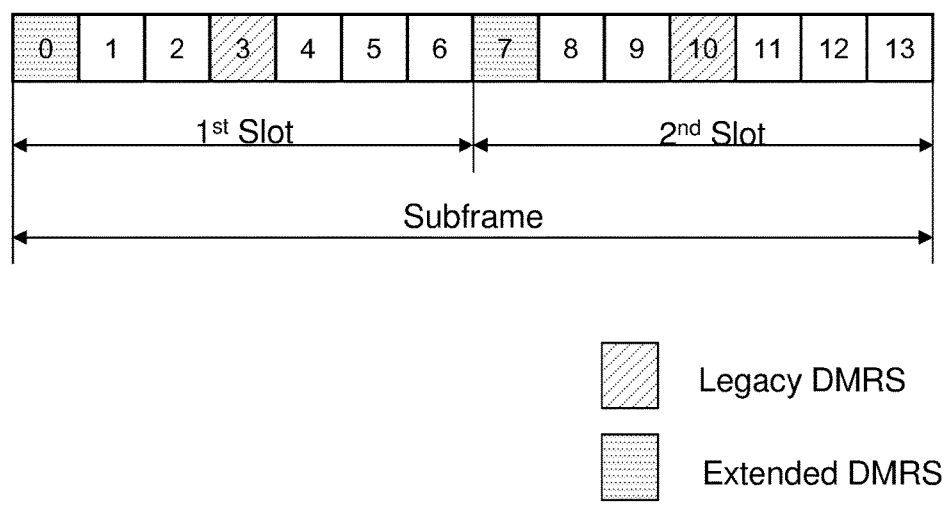
FIG. 12 is an exemplary diagram illustrating a method for enhancing a DMRS for demodulating a PUSCH.

FIG. 12 is an Exemplary Diagram Illustrating a Method for Enhancing a DMRS for Demodulating a PUSCH.

Referring to FIG. 12, one subframe is illustrated based on the normal CP. The existing DMRS is transmitted in symbol #3 and symbol #10. In order to increase the density, for example, an additional reference signal (extended DMRS) may be transmitted on symbol #0 and symbol #7.

The PUSCH may include uplink control information (UCI). The UCI may include the HARQ-ACK/NACK and the RI as described above. The UCI including the HARQ-ACK/NACK may be transmitted through OFDM (SC-FDMA) symbols #2, #4, #9, and #11 based on the normal CP and the UCI including the RI may be transmitted through OFDM (SC-FDMA) symbols #1, #5, #8, and #12. Therefore, transmitting the additional reference signal may be excluded from a location where the HARQ-ACK or the RI may be transmitted. In this case, even though the density of the reference signal for demodulating the PUSCH is increased, it is advantageous in that UCI mapping need not be modified. However, since the MTC device may not transmit the RI, it may be considered that the additional reference signal is mapped to the OFDM (SC-FDMA) symbol to which the RI may be mapped.

The OFDM (SC-FDMA) symbol in which the additional reference signal (that is, extended DMRS) may be transmitted is illustrated below according to each CP type.

Normal CP: #0, (#1), (#5), #6, #7, (#8), (#12), #13

Extended CP: (#0), (#4), #5, (#6), (#10), #11

OFDM (SC-FDMA) symbol indexes in parentheses indicate the symbols to which RI may be mapped. The additional reference signal (that is, enhanced DRMS) may be mapped only in a subset of the OFDM (SC-FDMA) symbol indexes. Meanwhile, in a last OFDM (SC-FDMA) symbol, the SRS may be transmitted and when the SRS is transmitted, it may be considered that the last OFDM (SC-FDMA) symbol is excluded from a region where the additional reference signal (that is, extended DMRS) may be transmitted by the unit of the subframe or the slot in order to prevent the density of the reference signal for demodulating the PUSCH from being changed. As one example, the additional reference signal (that is, enhanced DRMS) may be transmitted in OFDM (SC-FDMA) symbols #0 and #7 based on the normal CP.

When the last OFDM (SC-FDMA) symbol (#6 and/or #13 based on the normal CP) is included in the region to which the additional reference signal (that is, extended DMRS) is mapped by the unit of the subframe or the slot, a situation in which the SRS and the additional reference signal (that is, extended DMRS) overlap with the same symbol may be processed as described in Section III given below.

On the other hand, a cyclic shift and an orthogonal cover code (OCC) may be applied to the DMRS for demodulating the PUSCH in the related art and a combination of the corresponding cyclic shift and the OCC varies for each UE to permit a plurality of PUSCHs to be multiplexed even with respect to the same time/frequency resource. As one example, when a first UE applies OCC [1 1] to the DMRS for the PUSCH transmitted thereby and a second UE applies OCC [1 −1] to the DMRS for the PUSCH transmitted thereby, the base station may divide the DMRSs of the respective PUSCHs and detect the UL-SCH (including the UCI) included in each PUSCH again from the corresponding divided DMRSs (even in a situation in which RBs in which both PUSCHs are transmitted partially overlap with each other).

In a next system, even when the additional reference signal (that is, extended DMRS) is introduced as described in this section, multiplexing the plurality of PUSCHs may be considered and the OCC needs to be designed for this case. Hereinafter, a more detailed example of an OCC design method will be described. Next, the existing DMRS for the PUSCH as the DMRS included in the existing Rel-11 means the DMRSs mapped to OFDMA (SC-FDMA) symbol #3 and OFDMA (SC-FDMA) symbol #10 based on the normal CP.

As a first exemplary method, the cyclic shift and the OCC are applied to the existing DMRS for the PUSCH similarly to the method used in the existing Rel-11 PUSCH. That is, the OCC having a length of 2 is applied to the existing DMRS. The cyclic shift and/or the OCC may be independently applied to the additional reference signal (that is, extended DMRS). The base station may separately add a field associated with the cyclic shift for the additional reference signal (that is, extended DMRS) into the DCI transmitted to the MTC device. Alternatively, the base station includes only a field associated with the cyclic shift for the existing DMRS in the DCI transmitted to the MTC device and the field may be used for both the existing DMRS and the additional reference signal. For example, the same cyclic shift and OCC may be applied to the existing DMRS and the additional reference signal according to the field. Alternatively, a value of a table indicated by the field associated with the cyclic shift may be extended to include information on the additional reference signal 9 that is, extended DMRS). In this method, the PUSCH which is enabled to be demodulated according to the existing DMRS and the PUSCH which is enabled to be demodulated according to the additional reference signal (that is, extended DMRS) may be permitted to be multiplexed and in this case, the additional reference signal (that is, extended DMRS) may not be used due to an influence of interference.

As a second exemplary method, the cyclic shift and/or the OCC may be configured by considering both the existing DRMS and the additional reference signal (that is, enhanced DRMS). When the number of OFDM (SC-FDMA) symbols to which the additional reference signal (that is, extended DMRS) is mapped is M, it may be considered that the OCC having a length of M+2 is applied. In this method, the PUSCHs demodulated according to the additional reference signal (that is, extended DMRS) may be permitted to be multiplexed with each other. As one example, in the case of M=2, the OCC may be configured by [+1 +1 +1 +1], [+1 +1 −1 −1], [+1 −1 +1 −1], and [+1 −1 −1 +1] or a combination of a form in which all codes are changed with respect to [+1 +1 +1 +1], [+1 +1 −1 −1], [+1 −1 +1 −1], and [+1 −1 −1 +1].

When PUSCH mapping is not performed with respect to some OFDM (SC-FDMA) symbols and when the DMRS is transmitted in the corresponding OFDM (SC-FDMA) symbol, an OCC application method may be different from that when the PUSCH is mapped in all OFDM (SC-FDMA) symbols. As one example, the length of the OCC and a sequence type may be differently applied.

As one example, the OCC having a length of 3 is applied to the additional reference signal (that is, extended DMRS) and when the DMRS includes the last OFDM (SC-FDMA) symbol, the DMRS mapped to the last OFDM (SC-FDMA) symbol is not also transmitted in a subframe in which a cell-specific SRS is enabled to be transmitted and a form in which the length of the OCC for the additional reference signal (that is, extended DMRS) is reduced to 2 (=3−1) may be applied.

II. Method for Newly Designing Structure of Reference Signal for Demodulating PUSCH As another method for increasing the density of the reference signal for demodulating the PUSCH, designing a mapping structure of the reference signal again from the beginning may be considered. In this case, the location of the DMRS may be designed to be evenly distributed according to the number of DMRSs to be introduced (by the unit of single or multiple slots/subframes/radio frames).

Figure 13:
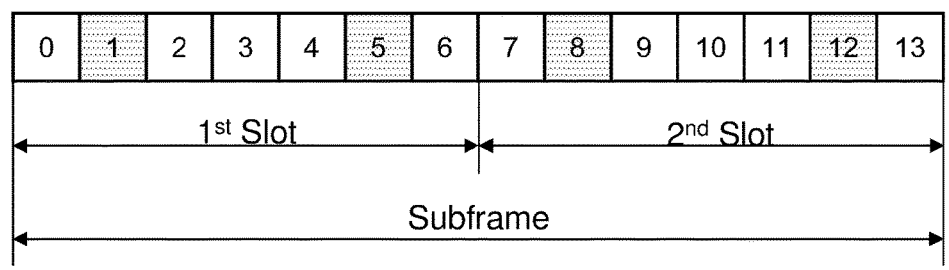
FIG. 13 illustrates an example in which a new DMRS for demodulating the PUSCH is mapped.
Figure 13:

FIG. 13 Illustrates an Example in which a New DMRS for Demodulating the PUSCH is Mapped.

As known with reference to FIG. 13, as another method for increasing the density of the reference signal for demodulating the PUSCH, the new DMRS may be mapped to, for example, the subset of #1, #5, #8, and #12 in the subframe of the normal CP.

Next, a detailed example of a method that may newly map the DMRS by increasing the density is described.

1) Normal CP:

Case 1-1: As illustrated in FIG. 13, the reference signal for demodulating the PUSCH is mapped to the subset of OFDM (SC-FDMA) symbols #1, #5, #8, and #12.

Case 1-2: The reference signal for demodulating the PUSCH is mapped to the subset of OFDM (SC-FDMA) symbols #2, #3, #4, #9, #10, and #11.

2) Extended CP:

Case 2-1: The reference signal for demodulating the PUSCH is mapped to the subset of OFDM (SC-FDMA) symbols #2, #3, #8, and #9.

According to the method described in this section, a method in which the UCI is mapped in a case where the UCI is transmitted through the PUSCH needs to be redefined. The case where the UCI is transmitted through the PUSCH may include a case where the MTC device transmits an aperiodic CSI and a case where a periodic CSI and/or HARQ-ACK to be transmitted to the PUCCH piggybacks to the PUSCH. Herein, the latter case may be interpreted as a situation in which only the PUSCH may be transmitted when the PUCCH and the PUSCH collide with each other.

Since the HARQ-ACK and the RI primarily have a higher priority than another UCI, the HARQ-ACK and the RI may be transmitted while being mapped to the OFDM (SC-FDMA) symbol approximate to the OFDM (SC-FDMA) symbol to which the DMRS is mapped. Further, since the SRS may be transmitted in the case of the last OFDM (SC-FDMA) symbol, it may be considered that the HARQ-ACK and/or the RI are/is mapped to the last OFDM (SC-FDMA) symbol (by the unit of the subframe/slot) due to the collision issue with the SRS. Since the MTC device may not transmit the RI, a mapping method for the HARQ-ACK is described in an example given below. Next, one example of a region to which the HARQ-ACK may be mapped for each case is described.

In Case 1-1, the HARQ-ACK is mapped to all or the subset of OFDM (SC-FDMA) symbols #2, #3, #4, #9, #10, and #11. In more detail, the HARQ-ACK may be mapped to OFDM (SC-FDMA) symbols #2, #4, #9, and #11.

In Case 1-2, the HARQ-ACK may be mapped to all or the subset of OFDM (SC-FDMA) symbols #1, #5, #8, and #12.

In Case 2-1, the HARQ-ACK may be mapped to all or the subset of OFDM (SC-FDMA) symbols #1, #4, #7, and #10.

The OCC may be applied even to a new reference signal (that is, DMRS) for demodulating the PUSCH having a new structure and new various PUSCHs demodulated according to the new reference signal may be multiplexed based on the applied OCC. When the number of DMRSs per subframe in the PUSCH having the new structure is M, as the OCC, (1) it may be considered that the OCC having a length of M is applied or (2) it may be considered that M/2 OCC combinations having a length of 2 are applied. (3) Alternatively, it may be considered that two OCC combinations having a length of M/2 are applied by the unit of the slot. When the PUSCH mapping is not performed with respect to some OFDM (SC-FDMA) symbols and when the DMRS is transmitted in the corresponding OFDM (SC-FDMA) symbol, the OCC application method may be different from that when the PUSCH is mapped in all OFDM (SC-FDMA) symbols. As one example, the length of the OCC and the sequence type may be differently applied.

Meanwhile, the additional reference signal (that is, extended DMRS) is mapped to the last OFDM (SC-FDMA) symbol (#6 and/or #13 based on the normal CP), and as a result, it may be considered that the situation in which the extended DMRS overlaps with the SRS is processed by a method of Section III given below.

III. UE Operation when SRS and PUSCH DRMS Collide with Each Other

In a situation in which the PUSCH is demodulated according to the additional reference signal (that is, enhanced DRMS), when the additional reference signal (that is, enhanced DRMS) is transmitted in the last OFDM (SC-FDMA) symbol or when the additional reference signal is transmitted in the OFDM (SC-FDMA) symbol in which the SRS may be transmitted, the additional reference signal may collide with the SRS which may be transmitted in the last OFDM (SC-FDMA) symbol or the OFDM (SC-FDMA) symbol in which the SRS may be transmitted by the unit of the subframe.

Figure 14:
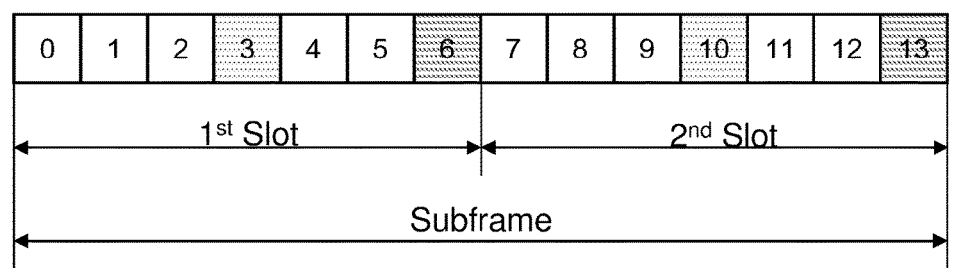
FIG. 14 illustrates an example in which the new DMRS for demodulating the PUSCH collides with the SRS.

FIG. 14 Illustrates an Example in which the New DMRS for Demodulating the PUSCH Collides with the SRS.

Referring to FIG. 14, when the additional reference signal (that is, enhanced DRMS) is transmitted in the last OFDM (SC-FDMA) symbol, the additional reference signal may collide with the SRS.

Therefore, in the case of the collision, the operations need to be designated.

The operation described in this section may be applied even to the SRS is used as the demodulation reference signal for the PUSCH in addition to the collision. That is, a situation in which the subframe in which the SRS is transmitted and the subframe in which the SRS is not transmitted have different densities of the demodulation reference signal may be considered.

Next, in the existing Rel-11 operation, conditions in which the PUSCH is not used in the last OFDM (SC-FDMA) symbol (by the unit of the subframe) are listed.

TABLE 6

Condition 1: not a part of the last SC-FDMA symbol on the same subframe when the UE transmits the SRS in the subframe
Condition 2: not a part of the last SC-FDMA symbol on the subframe in which a cell-specific SRS is configured when PUSCH transmission generally or partially overlaps with a cell-specific SRS bandwidth
Condition 3: not a part of the SC-FDMA symbol reserved for SRS transmission available in the subframe in which a UE-specific aperiodic SRS is transmitted
Condition 4: not a part of the SC-FDMA reserved for SRS transmission available in a UE-specific periodic SRS subframe when the UE configures multiple timing advance groups (TAGs)

III-1. Method for Determining Configuration Information for SRS Transmitted by MTC Device As described above, the MTC device may transmit/receive a data channel/control channel by using only a reduced bandwidth (that is, an MTC subband) smaller than an entire system of the cell as described with reference to FIGS. 10a and 10b.

However, the MTC device may influence the SRS transmitted by the legacy UE in transmitting the uplink channel (for example, PUSCH or PUCCH).

Figure 15:
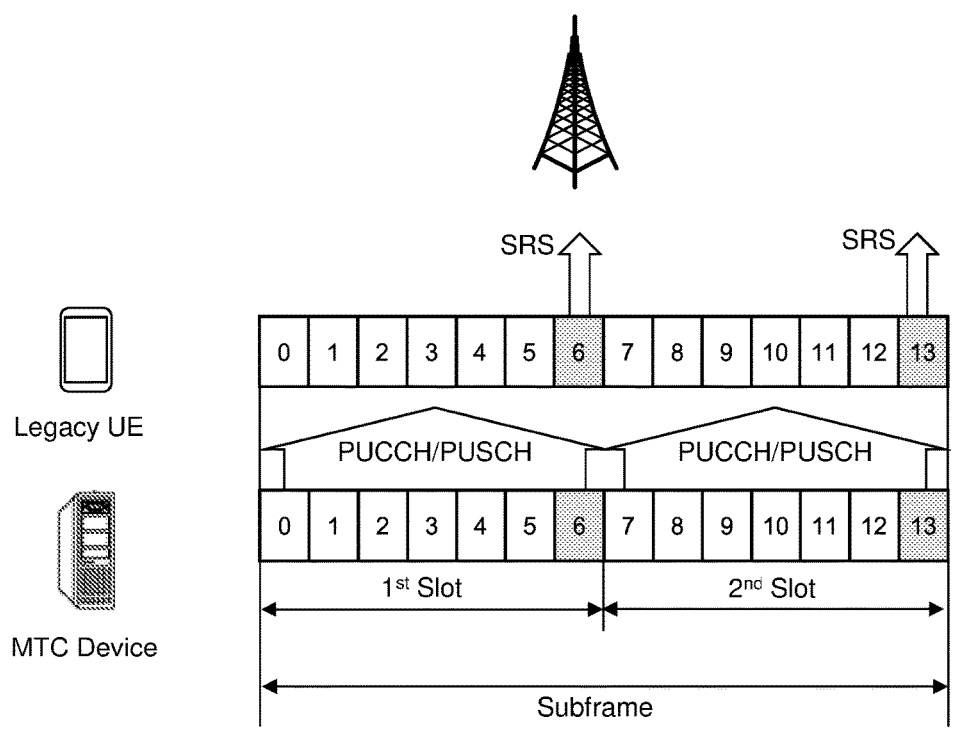
FIG. 15 illustrates an example in which an uplink channel transmitted by the MTC device influences the SRS transmitted by the legacy UE.

FIG. 15 Illustrates an Example in which an Uplink Channel Transmitted by the MTC Device Influences the SRS Transmitted by the Legacy UE.

As known with reference to FIG. 15, the uplink channel transmitted by the MTC device, for example, the PUCCH/PUSCH may influence the SRS transmitted by the legacy UE.

Therefore, hereinafter, this will be described.

In order to consider an issue in which uplink transmission of the MTC device collides with the SRS of the legacy UE, it may be primarily considered that all or some of the SRS configuration information for the SRS of the legacy UE is transferred to the MTC device through a higher layer signal. In more detail, the SRS configuration information may include information on the cell-specific SRS subframe and/or cell-specific SRS bandwidth. The MTC device may (additionally) apply Condition 2 even to the SRS configuration information for the SRS of the legacy UE based on the information. That is, when the PUSCH transmission of the MTC device overlaps with all or some of the SRS bandwidth depending on the SRS configuration information for the SRS of the legacy UE and when the subframe in which the MTC device will transmit the PUSCH is a subframe in which the cell-specific SRS depending on the SRS configuration information for the SRS of the legacy UE is configured, the MTC device may not transmit the PUSCH on the last SC-FDMA symbol. In order to prevent the PUSCH from being transmitted on the last symbol as described above, the MTC device may rate-match the PUSCH only with other symbols other than the last symbol.

Figure 16:
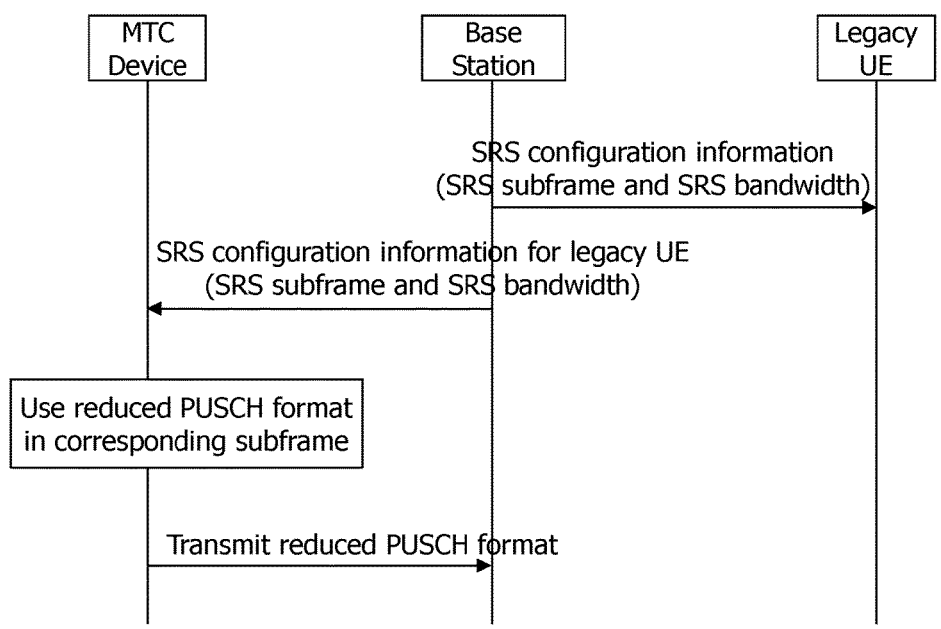
FIG. 16 is an exemplary diagram illustrating one method for preventing the SRS transmitted by the legacy UE and the PUSCH transmitted by the MTC device from colliding with each other.

FIG. 16 is an Exemplary Diagram Illustrating One Method for Preventing the SRS Transmitted by the Legacy UE and the PUSCH Transmitted by the MTC Device from Colliding with Each Other.

The base station transmits the SRS configuration information for the legacy UE in the cell to the legacy UE, but transmits the SRS configuration information even to the MTC device. The SRS configuration information may include information (that is, SRS-SubframeConfig) on the subframe in which the SRS may be transmitted and information (SRS-BandwidthConfig) on a bandwidth in which the SRS may be transmitted.

When the PUSCH transmission of the MTC device overlaps with all or some of the SRS bandwidth depending on the SRS configuration information for the SRS of the legacy UE and when the subframe in which the MTC device will transmit the PUSCH is a subframe in which the cell-specific SRS depending on the SRS configuration information for the SRS of the legacy UE is configured, the MTC device may use the reduced PUSCH format. That is, the MTC device may not transmit the PUSCH on the last SC-FDMA symbol of the corresponding subframe. In order to prevent the PUSCH from being transmitted on the last symbol as described above, the MTC device may rate-match the PUSCH only with other symbols other than the last symbol.

Further, the MTC device may drop transmission of the SRS on the last symbol in the subframe indicated by the subframe information in the SRS configuration information for the legacy UE.

Meanwhile, when the legacy UE transmits both the PUCCH including the HARQ-ACK/NACK and the SRS on the same subframe, the PUCCH and the SRS may collide with each other. In order to solve the collision, the shorted PUCCH format is used in the related art. Herein, the reduced PUCCH means that the sounding reference signal (SRS) is transmitted instead of the PUCCH in the last symbol.

Therefore, when the reduced PUCCH format is configured (when simultaneous transmission of the SRS and the HARQ-ACK is configured), the MTC device may determine whether to apply the reduced PUCCH format by considering the cell-specific SRS subframe and/or cell-specific SRS bandwidth for the SRS of the legacy UE. For example, after the MTC device receives both the SRS configuration information for the legacy UE and the SRS configuration information for the MTC device itself, when one of both SRS configuration information satisfies the condition (in particular, when Condition 2 is satisfied), the last OFDM (SC-FDMA) symbol may be excluded in mapping the PUCCH to be transmitted.

The reduced PUCCH format may be applied when a specific higher layer signal is turned on. Herein, the specific higher layer signal may be ackNackSRS-SimultaneousTransmission of the SRS configuration information for the legacy UE. Alternatively, the reduced PUCCH format may be applied according to a separate higher layer signal. The separate higher layer signal may be used for the MTC device.

The aforementioned contents are described below in brief once more with reference to drawings.

Figure 17:
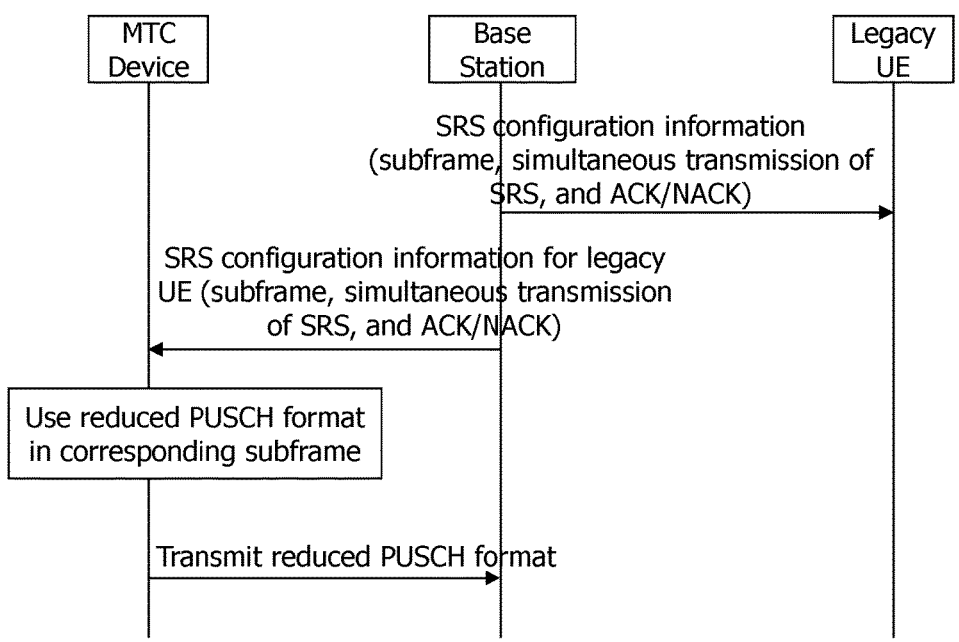
FIG. 17 is an exemplary diagram illustrating one method for preventing the SRS transmitted by the legacy UE and the PUCCH transmitted by the MTC device from colliding with each other.

FIG. 17 is an Exemplary Diagram Illustrating One Method for Preventing the SRS Transmitted by the Legacy UE and the PUCCH Transmitted by the MTC Device from Colliding with Each Other.

The base station transmits the SRS configuration information for the legacy UE in the cell to the legacy UE, but transmits the SRS configuration information even to the MTC device. The SRS configuration information may include the information (that is, SRS-SubframeConfig) on the subframe in which the SRS may be transmitted and configuration information (that is, ackNackSRS-Simultaneous Transmission) on for simultaneous transmission of the SRS and the HARQ-ACK/NACK.

Then, when the simultaneous transmission of the SRS and the HARQ-ACK/NAC is configured on the subframe indicated by the subframe information in the SRS configuration information for the legacy UE, the MTC device may transmit the PUCCH only on the symbols other than the last symbol on the subframe according to the reduced PUCCH format.

In this case, even though the SRS is not actually transmitted on the last symbol in the subframe indicated by the subframe information, the reduced PUCCH format may be used.

Meanwhile, the MTC device may drop the transmission of the SRS on the last symbol in the subframe indicated by the subframe information in the SRS configuration information for the legacy UE.

Meanwhile, a more detailed example is described below. When a PUCCH transmission region of the MTC device wholly or partially overlaps with the cell-specific SRS bandwidth of the legacy UE, (1) the reduced PUCCH format may be continuously used or (2) whether the reduced PUCCH format is used may be determined according to the higher layer signal for the MTC device. When the PUCCH transmission region of the MTC device does not overlap with the cell-specific SRS bandwidth of the legacy UE, the MTC device may determine whether the reduced PUCCH format is used according to the higher layer signal indicating whether the HARQ-ACK and the SRS of the legacy UE are simultaneously transmitted. Code division multiplexing (CDM) is enabled between the PUCCH of the legacy UE and the PUCCH of the MTC device through the method and the SRS of the legacy UE may be continuously protected so that the MTC device uses the reduced PUCCH format in a frequency domain in which the SRS of the legacy UE may be transmitted.

As another method, when not the entirety of the system band of the cell but the MTC subband (e.g., 6 RBs) is allocated to the MTC device, the base station may transfer information on a subframe which should not be mapped to the last OFDM (SC-FDMA) symbol to the MTC device through the higher layer signal. Similarly, as a verification result according to the subframe information, when the reduced PUCCH format is configured on the corresponding subframe (when the simultaneous transmission of the SRS and the HARQ-ACK is configured), the MTC device may apply the reduced PUCCH format in the corresponding subframe.

Meanwhile, the base station may consider that the (cell-specific) configuration information (e.g., the SRS bandwidth and the SRS subframe) for the SRS of the MTC device coincides with the information on the configuration of the SRS of the legacy UE. In this case, the base station may transfer only the configuration information on the SRS of the MTC device without the need for separately transferring the configuration information for the SRS for the legacy UE to the MTC device. Nevertheless, the MTC device may prevent the SRS of the MTC device and the PUCCH/PUSCH of the legacy UE from colliding with each other through the method. However, since the commonly configured (cell-specific) SRS configuration may enable the SRS of the MTC device and the SRS of the legacy UE from being multiplexed with each other, when the quantity of resources occupied between information on actual transmission SRS transmission and the cell-specific SRS configuration is large like the U-specific SRS configuration, etc., both the legacy UE and the MTC device may unnecessarily perform rate-matching for the PUCCH/PUSCH or use the reduced PUCCH format in order to avoid the SRS collision.

III-1-1. SRS Transmission Method of MTC Device

In the case where the (cell-specific) configuration information (the SRS bandwidth and the SRS subframe) for the SRS of the MTC device is the same as the configuration information for the SRS of the legacy UE or the case where the (cell-specific) configuration information is configured as the subset of the configuration information for the SRS of the legacy UE, the resource for the SRS of the MTC device and the resource of the SRS of the legacy UE need to be separated/distinguished on the corresponding common resource. In brief, the resource for the SRS of the MTC device and the resource for the SRS for the legacy UE may be subjected to time division multiplexing (TDM) and/or frequency division multiplexing (FDM) and/or code division multiplexing (CDM) through a combination of a configuration for the UE-specific SRS subframe, a configuration for the UE-specific SRS bandwidth, a Comb index, and the like. In more detail, when the SRS of the MTC device and the SRS of the legacy UE are divided by the TDM and/or FDM, the SRS of the MTC device may be made to be transmitted by the unit of 6 RBs. In more detail, 6 RBs for the SRS transmission of the MTC device may correspond to a specific MTC subband. When the configuration for the SRS of the MTC device is determined based on the configuration for the SRS of the legacy UE, the MTC device may not enable the SRS to be transmitted throughout the entire MTC subband thereof. As one example, it is assumed that the MTC subband includes 6 RBs and the MTC device transmits only the PUSCH in the corresponding MTC subband. In this case, when the base station determines the configuration of the SRS of the MTC device based on the configuration for the SRS of the legacy UE, the bandwidth for the SRS of the MTC device may be determined as the unit of a minimum of 4 RBs. Further, four RBs may not be positioned on the MTC subband. In this case, since the MTC device needs to secure a time required for retuning an RF unit, transmission of the PUSCH/PUCCH may be limited on some symbols and in this case, the SRS may not also be transmitted. The method may operate differently according to the periodic SRS or the aperiodic SRS and as one example, when boundaries of the SRS to be transmitted when the band for transmitting the PUSCH and the SRS and the MTC subband do not overlap with each other corresponds to the periodic SRS, the transmission of the corresponding SRS may be dropped and when the SRS to be transmitted is the aperiodic SRS, the PUSCH may be punctured or the transmission of the PUSCH may be restricted on the overlapped symbol.

Meanwhile, the MTC device may consider that the SRS is transmitted throughout the entire MTC subband (e.g., 6 RBs) or limit a transmission unit to 1 RB or a specific RB (dynamically designated by the network) in order to drive transmission power to a specific RE/RB. Alternatively, the MTC device may use only a configuration based on 6 RBs or less (e.g., 4 RBs) among the configurations for the SRS of the legacy UE. When the coverage is extended or the SRS is repeatedly transmitted, the MTC device may transmit the SRS on multiple consecutive SC-FDMA symbols throughout one or multiple subframes. As one example, the MTC device may repeatedly transmit the SRS in all symbols corresponding to the resources for the SRS transmission. In this case, when the base station transfers the configuration information for the SRS for the legacy UE (through the higher layer signal, etc.,), the MTC device may not repeatedly transmit the SRS of the MTC device on the subframe indicated in the configuration information. Alternatively, in order to prevent the collision with the SRS of the legacy UE at the corresponding time, the MTC device may repeatedly transmit the SRS of the MTC device only on residual symbols other than the last symbol. As another method, the MTC device permits the SRS to be transmitted even on the last SC-FDMA symbol and may transmit the SRS throughout multiple subframes. The number of repetition times/a repetition level of the SRS may be determined by the number of symbols in which the SRS is transmitted. For the repeated transmission of the SRS, the base station may configure a substrate in which the MTC device will start the repeated transmission of the SRS in the MTC device through the higher layer signal. The configuration may be independently achieved for each coverage enhancement (CE) level or for each group of the coverage enhancement (CE) level.

Meanwhile, the base station may dynamically configure whether the MTC device needs to transmit the SRS. As one example, the base station may indicate a mode to prevent the MTC device from transmitting the SRS in some bands or a mode to prevent the MTC device from transmitting the SRS on some subframes in transferring the SRS configuration for the MTC device. Alternatively, the base station may indicate whether the MTC device transmits the SRS through the higher layer signal. The base station may designate whether the MTC device transmits the SRS through the higher layer signal differently for each coverage enhancement (CE) level or for each group of the coverage enhancement (CE) level.

III-1-2. Collision Between SRS of MTC Device and PUSCH/PUCCH of MTC Device

A next considerable situation relates to a situation in which the SRS of the MTC device and the PUSCH/PUCCH of the MTC device collide with each other. Basically, as the SRS configuration related parameters (the SRS subframe, the SRS bandwidth, etc.,), types which are commonly configured with respect to all or some MTC devices may be considered. Herein, the some MTC devices may be MTC devices which operate in the same MTC subband.

The MTC device may not map the PUSCH to the last OFDM (SC-FDMA) or the OFDM (SC-FDMA) symbol in which the SRS may be transmitted (by the unit of the subframe) according to Condition 1-4 based on the commonly configured SRS parameters. Whether the last symbol of the PUSCH is used may be indicated through the higher layer signal. In more detail, whether the last symbol of the PUSCH is used may be independently indicated for each coverage enhancement (CE) level or for each group of the coverage enhancement (CE) level for the SRS or the PUSCH. In more detail, when the bands in which the SRS and the PUSCH are transmitted are different from each other, the MTC device may not transit the PUSCH during a time gap used for frequency hopping. The time gap may correspond to one OFDM symbol or multiple OFDM symbols or one slot. For example, the MTC device may not transmit the PUSCH on two symbols corresponding to a time section in which the frequency hopping is performed. On the other hand, the MTC device may transmit the uplink channel while changing the frequency from a first subband to a second subband. For example, when the MTC device intends to transmit the PUSCH in the second band while transmitting the PUCCH in the first subband, the MTC device may perform RF retuning on first two symbols instead of transmitting the PUSCH on the first two symbols to which the PUSCH is mapped. Alternatively, when the MTC device intends to transmit the PUCCH in the second band while transmitting the PUSCH in the first subband, the MTC device may perform the RF retuning on last two symbols instead of transmitting the PUSCH on the last two symbols to which the PUSCH is mapped. On the other hand, in the case where one slot is used as the time gap, when the PUSCH and the SRS are configured to be simultaneously transmitted on the same subframe, the MTC device may transmit the PUSCH on a first slot and transmit the SRS on a second slot. In this case, the MTC device may repeatedly transmit the SRS on the OFDM symbol of the second slot which remains other than the time required for the frequency hopping. Through such a method, the base station may prevent the SRS transmitted by the first MTC device and the PUSCH/PUCCH transmitted by the second MTC device from colliding with each other. Alternatively, in a frequency gap section required for the frequency hopping, the MTC device may drop the transmission of the SRS or delay the repeated transmission of the SRS. In this case, the MTC device may transmit the PUCCH/PUSCH with respect to the last symbol or a region other than the last symbol.

In more detail, in order to support the frequency hopping of the PUCCH/PUSCH under the condition, even when the frequency hopping is performed in the subframe just next to the subframe in which the corresponding PUCCH/PUSCH is transmitted, the MTC device may not map the PUCCH/PUSCH onto the last OFDM (SC-FDMA) symbol or last several OFDM (SC-FDMA) symbols or one slot (by the unit of the subframe). In this case, when the SRS is scheduled to be transmitted on the subframe in which the frequency hopping is performed, the MTC device may drop transmission of the corresponding SRS. The subframe in which the frequency hopping is performed may be configured according to the higher layer signal or configured according to a predetermined pattern. As one example, when the MTC device transmits the PUSCH in subframe n and performs the frequency hopping in order to change the MTC subband of the MTC device in subframe n+1, the MTC device may not map the PUCCH/PUSCH in the last OFDM (SC-FDMA) symbol, last several OFDM symbols, or one slot of the subframe n. In more detail, the MTC device may not map the PUCCH/PUSCH onto the multiple OFDM (SC-FDMA) symbols for the frequency hopping.

Meanwhile, when the MTC device performs a coverage enhancement operation (e.g., repeated transmission of all or some channels), the MTC device may unconditionally drop the transmission of the SRS and map the PUCCH/PUSCH to the corresponding resource. In more detail, whether the transmission of the SRS is dropped may be determined according to the higher layer signal from the base station. The higher layer signal may vary between the PUCCH and the PUSCH and/or vary for each coverage enhancement (CE) level/each group of the coverage enhancement (CE) level. The MTC device may drop the transmission of the SRS only when dropping the transmission of the SRS by the MTC device is indicated by the higher layer signal. Further, when the higher layer signal is received, the MTC device may drop the transmission of the SRS even in the case where the MTC device does not perform the coverage enhancement. In more detail, when the MTC device performs the frequency hopping, the PUCCH/PUSCH may not be mapped onto the last OFDM (SC-FDMA) symbol (by the unit of the subframe) in the frequency domain or the time section in which the MTC subband is performed. In this case, when the frequency hopping is performed during the time section corresponding to the multiple subframes, the MTC device may just map the PUCCH/PUSCH to the last OFDM (SC-FDMA) symbol (by the unit of the subframe) in the frequency domain or the time section in which the MTC subband is not changed. Additionally, it may be assumed that the MTC device which operates in the MTC subband does not transmit the SRS during a time (during an inconsecutive time section or a consecutive time section) during which the PUCCH/PUSCH is transmitted. The reason is that it is difficult for the MTC device to transmit the SRS in a subband other than the MTC subband in which the PUSCH is transmitted. More additionally, the MTC device may stop the transmission of the SRS during a time section in which the MTC device transmits the PUCCH or PUSCH, during a section in which the MTC device which operates as half-duplex FDD monitors the PDCCH (that is, M-PDCCH) for the MTC device, or during a section in which the MTC device receives data.

When a region to which the PUSCH will not be mapped is designated according to Condition 1-4 related to the SRS configuration parameter for the MTC device, the PUSCH may be prevented from being mapped onto the multiple OFDM (SC-FDMA) symbols for purposes for enhancement of the SRS, etc. In this case, the MTC device may transmit the SRS on the corresponding multiple OFDM (SC-FDMA) symbols.

As another method, only the MTC device may not map the PUSCH/PUCCH on the last OFDM (SC-FDMA) symbol. The base station may notify that the MTC device maps the PUSCH/PUCCH on the last OFDM (SC-FDMA) symbol to the MTC device through the higher layer signal so as to prevent the MTC device from mapping the PUSCH/PUCCH on the last OFDM (SC-FDMA) symbol. The higher layer signal may designate a set of subframes or designate a set of subbands. When the SRS is transferred to the MTC device through the higher layer signal, the MTC device may differentiate application according to the higher layer signal since a predetermined period. Further, the higher layer signal may notify the mode to the MTC device. When the higher layer signal is transferred, the MTC device may transmit a general PUCCH/PUSCH on all subframes (that is, subframes other than the SRS subframes configured for the MTC device) (it is assumed that this is notified to the MTC device through an MTC-SIB). Alternatively, it may be assumed that the MTC device continuously uses the reduced PUCCH format and it may be assumed that the MTC device is configured with the set of subframes or the set of subframes and the set of subbands in which a general PUCCH format may be used from the base station. When the set of subbands is given, the MTC device may apply the corresponding configuration only when the given set of subbands coincides with the set of subbands in which the PUCCH or PUSCH may be transmitted.

On the other hand, it may be considered that the MTC devices do not use carrier aggregation (CA) and in this case, Condition 4 may be excluded from the application among the conditions. Meanwhile, the PUSCH is primarily described up to now, but the corresponding description may be applied even in determining whether the reduced PUCCH format is used. As described above, in the case of the PUCCH, following conditions may be applied instead of the conditions.

TABLE 7

Condition 1': The cell-specific SRS should not be a part of the last SC-FDMA symbol on the configured subframe
Condition 1": When the bandwidth for transmitting the PUCCH partially or wholly overlaps with the cell-specific SRS bandwidth, the cell-specific SRS should not be a part of the last SC-FDMA symbol on the configured subframe The method proposed by the present invention can be used in various schemes as well as in ICIC. For example, the method can be used to identify the difference between DL timings of multiple serving cells, and to maintain synchronization of each serving cell. The reduced PUCCH format according to the condition application may be used as a case where the simultaneous transmission of the HARQ-ACK/NACK and the SRS is configured in the higher layer with respect to the corresponding MTC device or cell or MTC subband.

In more detail, Condition 1' may be applied to the cell-specific or subband-specific SRS configuration information for the MTC device using the same MTC subband. In addition, Condition 1" may be applied to the remainder (the SRS configuration information for the legacy UE and/or the cell-specific or subband-specific SRS configuration information for the MTC devices which operate in other MTC subbands). Alternatively, when the MTC device does not perform the SRS transmission (when the MTC device corresponds to a specific coverage enhancement (CE) level coverage enhancement (CE) level group), the MTC device may apply Condition 1" and when the MTC device performs the SRS transmission, the MTC device may apply Condition 1'.

In the related art, the reason for allowing the reduced PUCCH format to be used even when the cell-specific SRS bandwidth and an actual PUCCH do not overlap with each other is that all UEs in the cell should be compelled to similarly use the reduced PUCCH format in order to multiplex the PUCCH transmitted by the corresponding UE and the PUCCH transmitted by another UE in the cell when even at least any one legacy UE in the cell uses the reduced PUCCH format in order to transmit both the PUCCH and the SRS. However, when the UEs that transmit the SRS and the PUCCH belong to different groups, if actual or reserved frequency resources do not overlap with each other, it may be efficient that the base station independently configures the reduced PUCCH format or not for the UEs in terms of resource utilization.

The base station may configure whether the MTC device uses the reduced PUCCH format through the higher layer signal. In more detail, the base station may configure whether the MTC device uses the reduced PUCC format through the higher layer signal for the MTC device independently for each coverage enhancement (CE) level or each group of the coverage enhancement (CE) level for the SRS or the PUCCH.

When the base station does not transfer the SRS configuration information for the legacy UE or when the MTC device does not configure the subframe to which the PUCCH is to be mapped (alternatively, not to be mapped) or the section or mode of the subframes on the last symbol, the MTC device may previously determine a default operation to be basically applied. The corresponding default operation may be preventing the MTC device from continuously mapping the PUSCH on the last symbol or contrary to this, allowing the MTC device to continuously map the PUSCH. In more detail, the default operation allows the MTC device to continuously map the PUSCH on the last symbol, but when the base station transfers the SRS configuration information for the MTC device, the MTC device may not map the PUSCH to the last symbol by referring to the corresponding configuration and the condition.

Next, one example of an operation method for Case A) a case where the MTC device maps the PUSCH on the last OFDM (SC-FDMA) symbol or the OFDM (SC-FDMA) symbol in which the SRS may be transmitted, Case B) a case where the MTC device transits the SRS on the last OFDM (SC-FDMA) symbol or the OFDM (SC-FDMA) symbol in which the SRS may be transmitted, and Case C) a case where the MTC device maps neither the PUSCH nor the SRS on the last OFDM (SC-FDMA) symbol or the OFDM (SC-FDMA) symbol in which the SRS may be transmitted will be described.

1) Case A: The Case where the MTC Device Maps the PUSCH on the Last OFDM (SC-FDMA) Symbol or the OFDM (SC-FDMA) Symbol in which the SRS May be Transmitted As a first example, the MTC device maps the UL-SCH to the corresponding region.

As a second example, the MTC device maps an additional DMRS to the corresponding region. The additional DMRS may be used for radio channel estimation for demodulating the PUSCH in addition to the DMRS already mapped to the PUSCH. Generation of a DMRS sequence may be performed in the same method as generation of the DMRS sequence mapped to another OFDM (SC-FDMA) symbol. In more detail, the region to which the DMRS is mapped may include a region to which the SRS transmission is mapped. Further, the DMRS sequence may be generated based on the inclusion of the SRS transmission region. In this case, the generation of the DMRS sequence may be different from the method for generating the DMRS sequence mapped to another OFDM (SC-FDMA) symbol.

As a third example, the MTC device maps an additional SRS to the corresponding region. The additional SRS may be used for the radio channel estimation for demodulating the PUSCH in addition to the DMRS already mapped to the PUSCH. In more detail, the additional SRS may be transmitted only in an RB (alternatively, frequency resource) region in which the PUSCH is transmitted. The additional SRS sequence may be generated based on the SRS configuration for the corresponding MTC device. In this case, comb may be applied. Herein, a comb type may be inconsecutively mapping the sequence to the subcarrier instead of consecutively mapping the sequence to the subcarrier at the time of mapping the sequence to the subcarrier. As one example, the sequence may be mapped only to even or odd indexes and no information may be mapped to residual subcarriers. Alternatively, the sequence of the additional SRS may be generated by the same method as the DMRS sequence, but may have a different sequence length from the DMRS sequence mapped to another OFDM (SC-FDMA) symbol.

2) Case B: The Case where the MTC Device Transmits the SRS on the Last OFDM (SC-FDMA) Symbol or the OFDM (SC-FDMA) Symbol in which the SRS May be Transmitted As the first example, the MTC device transmits the SRS on the OFDM (SC-FDMA) symbol. In a region where the frequency resource in which the SRS is transmitted and the frequency resource in which the PUSCH is transmitted overlap with each other, it may be considered that the correspond SRS is used for the radio channel estimation for demodulating the PUSCH. In more detail, the SRS may be transmitted on the last OFDM (SC-FDMA) symbol. The sequence of the SRS may be generated based on the SRS configuration for the corresponding MTC device. In this case, the comb may be applied. Alternatively, the SRS sequence may be generated by the same method as the DMRS sequence. However, the SRS sequence may have a different length from the DMRS sequence mapped onto another OFDM (SC-FDMA) symbol.

As the second example, the MTC device maps the DMRS to the corresponding region. In this case, the MTC device may drop the transmission of the SRS and transmit the DMRS of the PUSCH instead of the SRS. The corresponding DMRS may substitute for the SRS in addition to being used for the radio channel estimation for demodulating the PUSCH. The generation method of the DMRS sequence may be the same as that of the DMRS sequence mapped to another OFDM (SC-FDMA) symbol. In more detail, the region to which the DMRS is mapped may include the region to which the SRS transmission is mapped. Further, the DMRS sequence may be generated based on the inclusion of the SRS transmission region. The DMRS including the SRS transmission region may correspond to the additional reference signal (that is, extended DMRS) among the DMRSs for demodulating the PUSCH. In this case, the generation method of the DMRS including the SRS transmission region may be different from the generation method of the DMRS sequence mapped to another OFDM (SC-FDMA) symbol.

As the third example, the MTC device may determine whether to transmit the SRS or the DMRS based on a parameter defined by the frequency resource region in which the SRS is transmitted and the frequency resource region in which the DMRS is transmitted. As one example, it may be considered that the MTC device transmits the reference signal corresponding to a superset of the frequency resource region. When the region in which the SRS is transmitted includes the region in which the DMRS is transmitted, the MTC device may transmit the SRS and in the contrary case, the MTC device may transmit the DMRS. When the superset does not exist, it may be considered that the MTC device transmits a separate reference signal. However, the separate reference signal may be the DMRS type (the sequence generation method of the DMRS and the mapping method to the subcarrier) and the SRS type (the sequence generation method of the SRS and the mapping method to the subcarrier (including the comb type)).

3) Case C: The Case where the MTC Device Maps Neither the PUSCH Nor the SRS on the Last OFDM (SC-FDMA) Symbol or the OFDM (SC-FDMA) Symbol in which the SRS May be Transmitted The MTC device transmits nothing while the OFDM (SC-FDMA) symbol is empty as it is. The reason therefor is that another MTC device or the legacy UE may transmit the SRS in the corresponding region.

As another method, the MTC device may map the SRS to all or some OFDM (SC-FDMA) symbols in which the DMRS is transmitted. In this case, the SRS transmitted by the MTC device may be subjected to code division multiplexing with the DMRS included in the PUSCH of another legacy UE based on the cyclic shift and/or OCC. To this end, it may be considered that the base station notifies the cyclic shift and/or OCC index to the MTC device for each parameter set of the periodic SRS or the aperiodic SRS for the MTC device. In this case, it may be considered that a process is omitted, in which the MTC device maps the PUSCH (and PUCCH) onto the last OFDM (SC-FDMA) symbol or the OFDM (SC-FDMA) symbol in which the SRS may be transmitted (by the unit of the subframe) in association with the SRS of the MTC device. In association with the legacy UE, the process may be just performed, in which the MTC device maps the PUSCH (and PUCCH) onto the last OFDM (SC-FDMA) symbol. Herein, the SRS sequence may be generated in the same method as the DMRS sequence and the method for mapping the SRS to the subcarrier may also be the same as the method for mapping the DMRS to the subcarrier. In this case, the comb type may not be applied. In this case, by increasing the density of the SRS, channel estimation performance by the SRS may be enhanced. In more detail, the OFDM (SC-FDMA) symbol in which the SRS is transmitted may correspond to the symbol in which the additional reference signal (that is, extended DMRS) is transmitted among the DMRSs for demodulating the PUSCH. When the MTC device transmits the SRS in the subframe without PUSCH transmission, it may be considered that the MTC device transmits only the SRS on all or some OFDM (SC-FDMA) symbols to which the DMRS may be mapped and in this case, a collision with the PUSCH (alternatively, PUCCH) transmitted by another UE may be divided in the CMD method by the cyclic shift and/or OCC configured in the DMRS and the SRS. When the MTC device transmits the SRS in the subframe with the PUSCH transmission, the MTC device may perform the sequence generation and the RE mapping with respect to the DMRS on the OFDM (SC-FDMA) symbol other than the OFDM (SC-FDMA) symbol to which the SRS is to be mapped similarly to the case where the SRS is not transmitted. In addition, the MTC device may perform the sequence generation and the RE mapping with respect to the OFDM (SC-FDMA) symbol to which the SRS is to be mapped by the same method as the DMRS. In more detail, the length of the sequence and the RE mapping may be configured differently from the DMRS with respect to the OFDM (SC-FDMA) symbol to which the SRS is to be mapped.

As one example, it is assumed that the MTC device maps the PUSCH to OFDM (SC-FDMA) symbols #0, #3, #7, and #10 based on the normal CP. Further, it is assumed that the OCC having the length of 4 is applied to the DMRS which is extended throughout the four symbols to be divided by the CDM method among the multiple UEs.

The corresponding MTC device may generate the DMRS for demodulating the PUSCH and perform the RE mapping according to resource allocation information for the PUSCH and DCI information on the cyclic shift, etc., in the subframe in which the SRS is not transmitted. In this case, the DMRS and the SRS of another UE may be distinguished by the combination of the OCC and the cyclic shift according to SRS parameters (the SRS bandwidth, the cyclic shift, the comb index, etc., which may be configured to be cell-specific/subcarrier-specific/UE-specific) of another UE. As one example, when N RBs are allocated to the PUSCH, the MTC device may generate the sequence of the reference signal having the length of N*Msc (herein, Msc as the number of subcarriers per RB may be 12) and map the DMRS to N RBs to which the corresponding PUSCH is allocated for the DMRS of the PUSCH.

The corresponding MTC device may additionally generate the DMRS for demodulating the PUSCH and perform the RE mapping to the DCI information for the PUSCH based on the SRS parameters of the corresponding MTC device in the subframe in which the SRS is transmitted. In this case, the SRSs from the multiple UEs may be distinguished by the combination of the OCC and the cyclic shift according to each SRS parameter. As a more detailed example, when RB allocations are different from each other between the SRSs or between the SRS and the PUSCH, the RB allocations may be distinguished by using the OCC and when the RB allocations are the same as each other, the RB allocations may be distinguished by the combination of the cyclic shift and/or the OCC. As one example, when N RBs are allocated to the PUSCH and the SRS is additionally mapped to K RBs in addition to the N RBs to which the PUSCH is allocated, and as a result, the SRS is allocated to a total of N+K RBs, the sequence having the length of N*K*Msc for the DMRS for demodulating the PUSCH and the sequence may be mapped to N+K RBs. As another example, when N RBs are allocated to the PUSCH and K RBs are allocated to the SRS so that the SRS does not overlap with the PUSCH or the SRS only partially overlaps with the PUSCH, the DMRS includes all regions to which the SRS and the PUSCH are allocated and the MTC device generates the sequence of the reference signal and performs the RE mapping based on a minimum of L RBs so as to consecutively enable the RE mapping.

The MTC device may generate the DMRS or SRS for demodulating the PUSCH and perform the RE mapping based on the SRS parameters of the corresponding MTC device in the subframe in which the corresponding MTC device transmits the SRS ad does not transmit the PUSCH. As one example, when the SRS is allocated to K RBs, the MTC device may generate the sequence having the length of K*Msc for the corresponding SRS and map the corresponding sequence to the REs on corresponding K RBs.

III-1-3. Aperiodic SRS Transmission of MTC Device

In a next-generation MTC environment, as the MTC device may operate only on not the entire system band but a partial subband of the cell, an RF retuning time for changing the subband or changing a frequency location may be additionally required when the MTC device transmits the SRS.

The legacy UE transmits the aperiodic SRS through an aperiodic SRS resource on the subframe which is earliest since four subframes since a time triggered by the base station and in some cases, a time required for retuning the RF may not be secured. In this case, a timing of transmitting the aperiodic SRS needs to be changed. In brief, when the MTC device detects triggering of the transmission of the SRS in subframe n (when receiving a DCI bundle requesting the transmission of the SRS is completed in the coverage enhancement (CE) situation), the MTC device may transfer the SRS in an earliest aperiodic SRS resource since subframe n+4+k. A value of the k may be 1 or more. However, when the MTC device need not retune the RF (when retuning the RF is not required for transmitting the SRS), the value of the k may be 0.

The SRS may be triggered by DCI format 0 (alternatively, DCI format 4) or a DCI (e.g., DCI format 1A, etc.) corresponding to downlink scheduling and in the case of the coverage enhancement, a processing method of a collision between the repeated transmission of the PUSCH and the repeated transmission of the SRS may vary depending on the DCI format for triggering the SRS. As one example, when the SRS is triggered through the DCI for uplink scheduling like DCI format 0, since the timing between the repeated transmission of the PUSCH and the repeated transmission of the SRS may be normally aligned, the MTC device may just perform the repeated transmission of the PUSCH and the repeated transmission of the aperiodic SRS. On the contrary, when the SRS is triggered through the DCI for the downlink scheduling, the MTC device may perform the repeated transmission of the SRS while performing the repeated transmission of the PUSCH which starts before transmitting the SRS. Alternatively, the MTC device may transmit the SRS through the aperiodic SRS resource since the repeated transmission of the PUSCH which is performed ends. As another method, when the aperiodic SRS is triggered through the DCI format corresponding to the downlink scheduling, the corresponding DCI may schedule only the SRS without scheduling the PUSCH. As a more detailed example, when the MTC device receives the DCI format (e.g., DCI format 0) for the uplink scheduling and the value of a field for requesting the aperiodic CSI in the corresponding DCI is 1 (alternatively, when the value of the field is not 0), the MTC device may interpret that the corresponding DCI includes not information for scheduling the PUSCH but only scheduling information for transmitting the SRS. For example, when a resource allocation field in the DCI is set to a value indicating one RB in the subband, the MTC device may transmit the SRS through one corresponding RB at the corresponding transmission time. The corresponding transmission time may correspond to an earliest SRS resource since a specific number of subframes (e.g., 4+k based on the FDD, herein, k is 0 or 1 or 2 by considering the RF retuning) since the MTC device receives the DCI. Meanwhile, the MTC device even information on the number of repetition times/coverage enhancement level, the subband, etc., included in the DCI as information for the SRS. When the MTC device transmits only the SRS, the MTC device may disregard a PUSCH hopping flag in the information on the PUSCH in the DCI and interpret the value of the PUSCH hopping flag as a part of the resource allocation field. In detail, when a pattern for the SRS is received through the higher layer signal, the MTC device may perform the repeated transmission of the SRS with the frequency hopping according to the PUSCH hopping flag. Alternatively, when the set of subbands in which the SRS is to be transmitted is received through the higher layer signal, the PUSCH hopping flag may designate which subband the MTC device reports or how many sets the MTC device reports.

As another of the DCI interpretation, residual fields other than the aperiodic SRS field in the DCI may have a value of a predetermined pattern type and in this case, the MTC device may determine whether the DCI for the uplink scheduling schedules the PUSCH transmission or only the SRS transmission based on the corresponding patterns. Alternatively, when the DCI for the uplink scheduling satisfies a predetermined combination, the higher layer signal may designate whether the DCI indicates reporting the aperiodic CSI or transmitting the aperiodic SRS.

Alternatively, the aperiodic SRS may be triggered together with the downlink scheduling. This may correspond to only the TDD or full duplex communicatable FDD. In the case of half-duplex communication, when the aperiodic SRS is triggered together with the downlink scheduling, the MTC device may transmit the SRS since receiving downlink data. This may mean that the transmission of the PUCCH may be delayed or dropped.

When the MTC device is triggered to transmit the aperiodic SRS, the MTC device may indicate the subband or frequency location to transmit the SRS through the configuration for the SRS of the MTC device or directly notify the location of the subband itself to the MTC device. However, in order to allow the MTC device to dynamically select the region to transmit the SRS, the base station may extend the SRS request field in the DCI to be transmitted to 2 bits or more. The format of the DCI including the SRS request field extended to 2 bits or more may be DCI format 0, 1A, etc. In this case, the base station may transmit the corresponding DCI only in a UE-specific search space (USS). The MTC device may more dynamically control an SRS transmission location according to the SRS request field extended to 2 bits or more, which is included in the DCI. As one example, when the SRS request field in the DCI is extended to 2 bits, the SRS request field may include a parameter associated with the frequency domain in which the SRS may be transmitted. Further, when the MTC device performs the repeated transmission of the SRS with the coverage enhancement, the extended SRS request field in the DCI may include the number of repeated transmission times of the SRS or the coverage enhancement level.

IV. Application of OCC to Data Region

In a next MTC system, for the coverage enhancement, it may be introduced that the base station and the MTC device repeatedly transmit all or some channels. The repetition may be performed by the unit of the subframe. In this case, when a channel environment is not good, it may be inefficient that multiple MTC devices share the PUSCH resource with each other by depending on only the CDM method for the DMRS and as a method for reducing the inefficiency, application of a CDM technique using the OCC, etc., even to the region (a region to which the UL-SCH and/or CQI/PMI is mapped) other than the DMRS may be considered.

In brief, it may be considered that the OCC sequence is allocated and applied to the multiple subframes/slots. As one example, when the length of the OCC is M, all values finally mapped into the corresponding subframe/slot may be multiplied by one value of the corresponding OCC sequence by mapping respective values constituting the OCC sequence one to one for each subframe/slot in M subframes/slots. As a more detailed embodiment, when the OCC sequence is [1 −1], values mapped to all REs of a first subframe/slot are multiplied by 1 and values mapped to all REs of a second subframe/slot may be multiplied by −1 with respect to two subframes/slots. The RE may be excluded from all of the REs.

Basically, in order to apply the OCC, since the values mapped to all of the REs of the subframe/slot as long as the length of the OCC (before the application of the OCC) need to be the same as each other (by the unit of the subframe/slot), it may be considered that the values are mapped to be the same as each other. However, when the number of subframes/slots to which the same OCC sequence is to be applied increases, an orthogonal characteristic may be alleviated or broken due to a characteristic in which a radio channel environment temporally varies, it may be considered that the OCC sequence is applied by the unit of a predetermined level of M subframes/slots. The value of the M may be 3 or 4.

The embodiments of the present invention which has been described up to now may be implemented through various means. For example, the embodiments of the present invention may be implemented by hardware, firmware, software, or combinations thereof. In detail, the embodiments will be descried with reference to the drawings.

Figure 18:
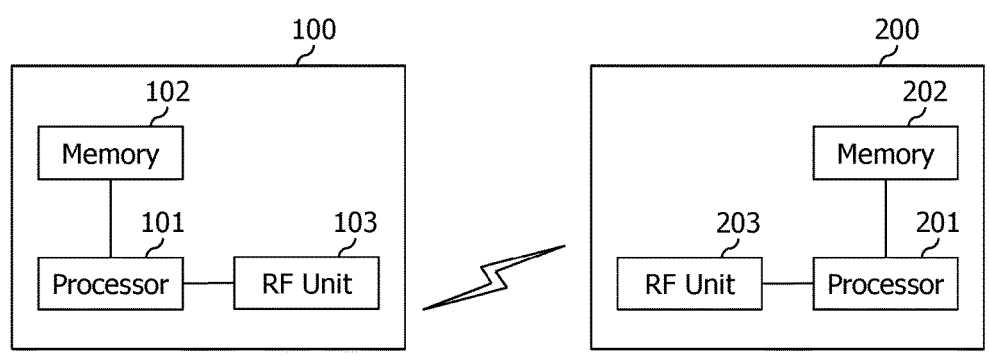
FIG. 18 is a block diagram illustrating a wireless communication system in which the disclosure of the present invention is implemented.

FIG. 18 is a Block Diagram Illustrating a Wireless Communication System in which the Disclosure of the Present Invention is Implemented.

A base station 200 includes a processor 201, a memory 202, and a radio frequency (RF) unit 203. The memory 202 is connected with the processor 201 to store various pieces of information for driving the processor 201. The RF unit 203 is connected with the processor 201 to transmit and/or receive a radio signal. The processor 201 implements a function, a process, and/or a method which are proposed. In the aforementioned embodiment, the operation of the base station may be implemented by the processor 201.

A UE 100 includes a processor 101, a memory 102, and an RF unit 103. The memory 102 is connected with the processor 101 to store various pieces of information for driving the processor 101. The RF unit 103 is connected with the processor 101 to transmit and/or receive a radio signal. The processor 101 implements a function, a process, and/or a method which are proposed.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the embodiment is implemented by software, the aforementioned technique may be implemented by a module (a process, a function, and the like) that performs the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for transmitting a physical uplink shared channel (PUSCH), the method performed by a wireless device and comprising:
   receiving information on a cell-specific sounding reference signal (SRS) subframe configured for any other user equipment (UE), wherein the wireless device is configured to not transmit the SRS,
   determining whether a subframe for transmitting a PUSCH includes a symbol overlapping an SRS symbol in the cell-specific SRS subframe; and
   mapping the PUSCH to one or more symbols of the subframe including the symbol overlapping the SRS symbol,
   wherein the symbol overlapping the SRS symbol is not used by the wireless device, which is configured to not transmit the SRS.

2. The method of claim 1, further comprising:
   determining whether the subframe for transmitting the PUSCH is the cell-specific SRS subframe.

3. A method for transmitting a sounding reference signal (SRS), the method performed by a wireless device and comprising:
   determining whether a first frequency band in a subframe n is not included within a second frequency band in a subframe n+1;
   when the first frequency band in the subframe n is not included within the second frequency band in the subframe n+1, determining that the SRS is to be dropped from the subframe n;
   when the first frequency band in the subframe n is included within the second frequency band in the subframe n+1, transmitting the SRS in the subframe n.

4. The method of claim 3, wherein the wireless device is configured for coverage enhancement or to use a reduced bandwidth.

5. The method of claim 3, further comprising:
   hopping from the first frequency band to the second frequency band.

6. The method of claim 3, wherein a physical uplink shared channel (PUSCH) is transmitted in the subframe n.

7. A wireless device for transmitting a physical uplink shared channel (PUSCH), the wireless device comprising:
   a transceiver configured to receive information on a cell-specific sounding reference signal (SRS) subframe configured for any other user equipment (UE), wherein the wireless device is configured to not transmit the SRS, and
   a processor, operatively coupled to the transceiver, wherein the processor is configured to:
   determine whether a subframe for transmitting a PUSCH includes a symbol overlapping an SRS symbol in the cell-specific SRS subframe; and
   map the PUSCH on one or more symbols of the subframe including the symbol overlapping the SRS symbol,
   wherein the symbol overlapping the SRS symbol is not used by the wireless device which is configured to not transmit the SRS.

8. The wireless device of claim 7, wherein the processor is further configured to:
   determine whether the subframe for transmitting the PUSCH is the cell-specific SRS subframe.

* * * * *